(12) United States Patent
Tahara et al.

(10) Patent No.: US 8,140,082 B2
(45) Date of Patent: Mar. 20, 2012

(54) COMMUNICATION SYSTEM, MOBILE STATION, SWITCH APPARATUS, AND COMMUNICATION METHOD

(75) Inventors: Takuhisa Tahara, Yokohama (JP);
Akimichi Tanabe, Kawasaki (JP);
Katsuhiro Noguchi, Yokohama (JP);
Shinpei Kawakatsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 436 days.

(21) Appl. No.: 12/092,113

(22) PCT Filed: Nov. 1, 2006

(86) PCT No.: PCT/JP2006/321893
§ 371 (c)(1),
(2), (4) Date: Jun. 30, 2008

(87) PCT Pub. No.: WO2007/052713
PCT Pub. Date: May 10, 2007

(65) Prior Publication Data
US 2008/0305767 A1 Dec. 11, 2008

(30) Foreign Application Priority Data
Nov. 1, 2005 (JP) ................ P2005-318917

(51) Int. Cl.
*H04Q 7/20* (2006.01)
(52) U.S. Cl. ........ 455/445; 455/411; 455/410; 370/255; 370/329
(58) Field of Classification Search .......... 455/400–466, 455/550.1–579.9
See application file for complete search history.

(56) References Cited

U.S. PATENT DOCUMENTS

| | | | | |
|---|---|---|---|---|
| 2001/0044295 A1* | 11/2001 | Saito et al. | ..................... | 455/410 |
| 2002/0015417 A1* | 2/2002 | Asahina | ........................ | 370/466 |
| 2004/0152444 A1* | 8/2004 | Lialiamou et al. | ............ | 455/406 |
| 2004/0235481 A1* | 11/2004 | Shimizu | ........................ | 455/445 |
| 2005/0071679 A1* | 3/2005 | Kiss et al. | ..................... | 713/201 |
| 2005/0239498 A1* | 10/2005 | Dorenbosch et al. | ...... | 455/552.1 |
| 2006/0052110 A1* | 3/2006 | Xu et al. | ....................... | 455/445 |

FOREIGN PATENT DOCUMENTS

| | | |
|---|---|---|
| JP | 2004-528761 A | 9/2004 |
| JP | 2005-510949 A | 4/2005 |

(Continued)

OTHER PUBLICATIONS

3GPP TS 33.203 V6.8.0 (Sep. 2005), 3rd Generation Partnership Project; Technical Specification Group Services and System Aspects; 3G security; Access security for IP-based services (Release 6), 44 pages.

(Continued)

*Primary Examiner* — Kent Chang
*Assistant Examiner* — Keith Fang
(74) *Attorney, Agent, or Firm* — Marvin A. Motsenbocker; Mots Law, PLLC

(57) ABSTRACT

A communication system according to the present invention includes: a mobile station 10; an access point located on a radio access system; and a switch apparatus 30 connected to the radio access system, wherein a secured connection between a mobile station 10 and the access point 20 has been already established. The mobile station 10 includes a judgment unit 30 configured to judge whether or not to establish a secured connection between the mobile station 10 and the switch apparatus 30.

12 Claims, 18 Drawing Sheets

FOREIGN PATENT DOCUMENTS

| | | |
|---|---|---|
| WO | WO 02/077820 A1 | 10/2002 |
| WO | WO 03/047154 A1 | 6/2003 |

OTHER PUBLICATIONS

The extended European search report issued on Oct. 7, 2011 in the counterpart European application.

Sebastian Garcin, "A new proposal for bundled access to IMS"; France Telecom R&D; ETSI TISPAN#7 (Sep. 15, 2011).

Yan Jun, et al.; "Some comments and proposal on IMS authentication bundled with NASS"; Huawei; ETSI TISPAN#7 (Jul. 11-15, 2005).

Yi-Bing Lin at al.; "One-pass GPRS and IMS authentication procedure for UMTS"; IEEE journal on selected areas in communications; vol. 23, No. 6, pp. 1233-1239 (Jun. 6, 2005).

* cited by examiner

| ACCESS POINT | SWITCH APPARATUS | IP sec |
|---|---|---|
| OPERATOR X | OPERATOR X | NECESSARY |
| OPERATOR X | OPERATOR Z | UNNECESSARY |
| OPERATOR Y | OPERATOR X | NECESSARY |

| SECRET | INTEGRITY | IP sec |
|--------|-----------|--------|
| AES | SHA-1 | UNNECESSARY |
| 3DES | SHA-1 | UNNECESSARY |
| DES | MD5 | NECESSARY |

|  | RANGE OF IP ADDRESSES |
|---|---|
| RADIO ACCESS SYSTEM A | 10.0.0.0~10.1.1.1 |
| RADIO ACCESS SYSTEM B | 10.1.1.1~10.2.2.2 |

COMMUNICATION SYSTEM, MOBILE STATION, SWITCH APPARATUS, AND COMMUNICATION METHOD

TECHNICAL FIELD

The present invention relates to a communication system, a mobile station, a switch apparatus, and a communication method, which establish a secured connection.

PRIOR ART

As for a radio network system, an IMS (Internet Protocol Multimedia Subsystem) has drawn attention in recent years. The IMS is a standard for converting services which have been provided so far through fixed networks, mobile communications, broadcasting, and the like into IP-based services so that a fused multimedia service is achieved.

The IMS is designed as an Infrastructure completely independent of an access network so that it can be managed by a business owner other than a mobile operator. A secure communication is achieved by providing an encryption function between a mobile station and an IMS apparatus. For example, as shown in FIG. 20, when a connection ensuring a secret/an integrity is established between a mobile station 10 and an access point 20 located on a radio access system, a secure connection is further established between the mobile station 10 and a switch apparatus 30 (here, an IMS apparatus) connected to the radio access system.

A procedure for establishing such a connection is described with reference to FIG. 21 (for example, refer to Non-Patent Document 1). Note that, FIG. 21 is a procedure in accordance with the 3GPP.

First, the mobile station 10 performs an authentication with the access point 20 located on the radio access system so as to exchange a secret key and an integrity key (S901). Then, the mobile station 10 stores an algorithm for the secret and the Integrity to be used in a radio zone (S902). Here, a secure connection is established between the mobile station 10 and the access point 20, located on the radio access system.

Next, the mobile station 10 transmits a user ID, an authentication request, an IPsec security association, and the like to the switch apparatus 30 (here, a P-CSCF (Proxy Call Session Control Function) 30a) so as to perform a SIP registration (S903). Next, the P-CSCF 30a transmits the user ID, the authentication request, and the like to a S-CSCF (Serving Call Session Control Function) 30b so as to perform the SIP registration (S904), and the S-CSCF 30b transmits a random number, the secret key, the integrity key, and the like to the P-CSCF 30a so as to perform an authentication challenge (S905). Next, the P-CSCF stores the secret key and the integrity key (S906). Next, the P-CSCF 30a transmits the random number, the secret key, the integrity key, and the like to the mobile station 10 so as to perform the authentication challenge (S907). Here, the secured connection is established between the access point 20 located on the radio access system and the switch apparatus 30.

Thereafter, the mobile station 10 transmits the user ID, a challenge response, an IPsec used algorithm, and the like to the P-CSCF 30a so as to perform the SIP registration (S908), and the P-CSCF 30a transmits the user ID, the challenge response, a validity of an IPsec secret and the Integrity, and the like, to the S-CSCF 30b so as to perform the SIP registration (S909). Next, the S-CSCF 30b transmits to the P-CSCF 30a the validity of the authentication (S910), and the P-CSCF 30a transmits to the mobile station 10 the validity of the authentication (S911).

However, it is common that a mobile operator has already ensured a security between the mobile station and the radio access system by applying an encryption to the radio access network, and it is also common that the mobile operator physically ensures a security for a zone from the radio access system to the IMS apparatus. Therefore, when the radio access system and the IMS apparatus accessing thereto are operated by the same operator, an encryption function of the IMS apparatus becomes redundant.

Further, for a future radio network system, based on the IMS, various services such as a VoIP and a Push to Talk are assumed to be achieved. Accordingly, shortening a time of a connection delay in connecting to the IMS apparatus, and reducing a process load on the mobile station and the network are important factors for improving a quality of a service and using the resources effectively.

Non-Patent Document 1: 3GPP TS33.203 V6.8.0

DISCLOSURE OF THE INVENTION

Therefore, the present invention was made in view of the above-mentioned problems, and an object thereof. Is to provide a communication system, a mobile station, a switch apparatus, and a communication method, which can shorten a time of delay in connecting the mobile station and a network, and reduce a process load on the mobile station and the network.

In order to solve the above problem, a first aspect of the present invention is summarized as a communication system for establishing a secured first connection between a mobile station and an access point located on a radio access system, including: a judgment unit configured to judge whether or not to establish secured second connection between the mobile station and a switch apparatus connected to the radio access system.

In the first aspect of the present invention, the judgment unit may judge where or not to establish the secured second connection, by comparing an identifier which is received from the access point and which uniquely identifies an apparatus controlling the radio access system, and an identifier which is received from the switch apparatus and which uniquely identifies an apparatus controlling the switch apparatus.

In the first aspect of the present invention, the communication system may further include an identifier list storage unit configured to store an identifier list which is combination of an identifier which is received from the access point and which uniquely identifies an apparatus controlling the radio access system, and an identifier which uniquely identifies an apparatus controlling the switch apparatus. And the judgment unit may be configured to judge whether or not to establish the secured second connection by comparing the identifier list, with the identifier which is received from the access point and which uniquely identifies the apparatus controlling the radio access system, and the identifier which is received from the switch apparatus and which uniquely identifies the apparatus controlling the switch apparatus.

In the first aspect of the present invention, the communication system may further include an identifier storage unit configured to store an identifier which uniquely identifies an apparatus controlling the switch apparatus, and the judgment unit may be configured to judge whether or not to establish the secured second connection, by comparing an identifier which is stored in the identifier storage unit, and an identifier which is received from the access point and which uniquely identifies an apparatus controlling the radio access system.

In the first aspect of the present invention, the communication system may further include an algorithm list storage unit configured to store, as an algorithm list, a secured algorithm used in the radio access system or a non-secured algorithm used in the radio access system, and the judgment unit may be configured to judge whether or not to establish the secured second connection by comparing an identifier which is received from the access point and which uniquely identifies an apparatus controlling the radio access system, and an identifier which is received from the switch apparatus and which uniquely identifies an apparatus controlling the switch apparatus, and by comparing the algorithm list and the algorithm used in the radio access system.

In the first aspect of the present invention, the communication system may further includes: an identifier list storage unit configured to store an identifier list which is a combination of an identifier which is received from the access point and which uniquely identifies an apparatus controlling the switch apparatus, and an identifier which uniquely identifies an apparatus controlling the switch apparatus; and an algorithm list storage unit configured to store, as an algorithm list, a secured algorithm used in the radio access system and a non-secured algorithm used in the radio access system, and the judgment unit may be configured to judge whether or not to establish the secured second connection, so by comparing an identifier which is received from the access point and which uniquely identifies an apparatus controlling the switch apparatus, and by comparing the algorithm list and the algorithm used in the radio access system.

In the first aspect of the present invention, the communication system may further include, in the mobile station: an identifier storage unit configured to store an identifier which uniquely identifies an apparatus controlling the switch apparatus; and an algorithm list storage unit configured to store, as an algorithm list, a secured algorithm used in the radio access system and a non-secured algorithm used in the radio access system, and the judgment unit may be configured to judge whether or not to establish the secured second connection, by comparing an identifier which is stored in the identifier storage unit, and an identifier which is received from the access point and which uniquely identifies an apparatus controlling the radio access system, and by comparing the algorithm list and the algorithm used in the radio access system.

In the first aspect of the present invention, the communication system may further include an address list storage unit configured to store an address list which indicates a range of an address assigned by the radio access system on which the switch apparatus is located, and the judgment unit may be configured to judge whether or not to establish the secured second connection, by comparing the address list and an address of the mobile station which is transmitted from the mobile station.

In the first aspect of the present invention, the communication system may further include: an address list storage unit configured to store an address list which indicates a range of an address assigned by the radio access system on which the switch apparatus is located; and an algorithm list storage unit configured to store, as an algorithm list, a secured algorithm used in the radio access system or a non-secured algorithm used in the radio access system on which the access point is located, and the judgment unit may be configured to judge whether or not to establish the secured connection, by comparing the address list and an address of the mobile station which is transmitted from the mobile station, and by comparing the algorithm list and the algorithm used in the radio access system on which the access point is located.

A second aspect of the present invention is summarized as a mobile station for establishing a secured first connection with an access point located on a radio access system, including: a judgment unit configured to judge whether or not to establish a secured second connection between the mobile station and a switch apparatus connected to the radio access system.

A third aspect of the present invention is summarized as a switch apparatus connected to a radio access system in a communication system for establishing a secured first connection between a mobile station and an access point located on the radio access system, including: a judgment unit configured to judge whether or not to establish a secured second connection between the mobile station and the switch apparatus.

A fourth aspect of the present invention is summarized as a communication method in a communication system provided with a mobile station, an access point located on a radio access system, and a switch apparatus connected to the radio access system, including: establishing a first secured connection between the mobile station and the access point; and determining whether or not to establish a secured second connection between the mobile station and the switch apparatus.

BRIEF DESCRIPTIONS OF THE DRAWINGS

BEST MODES FOR CARRYING OUT THE INVENTION

Figure 1:
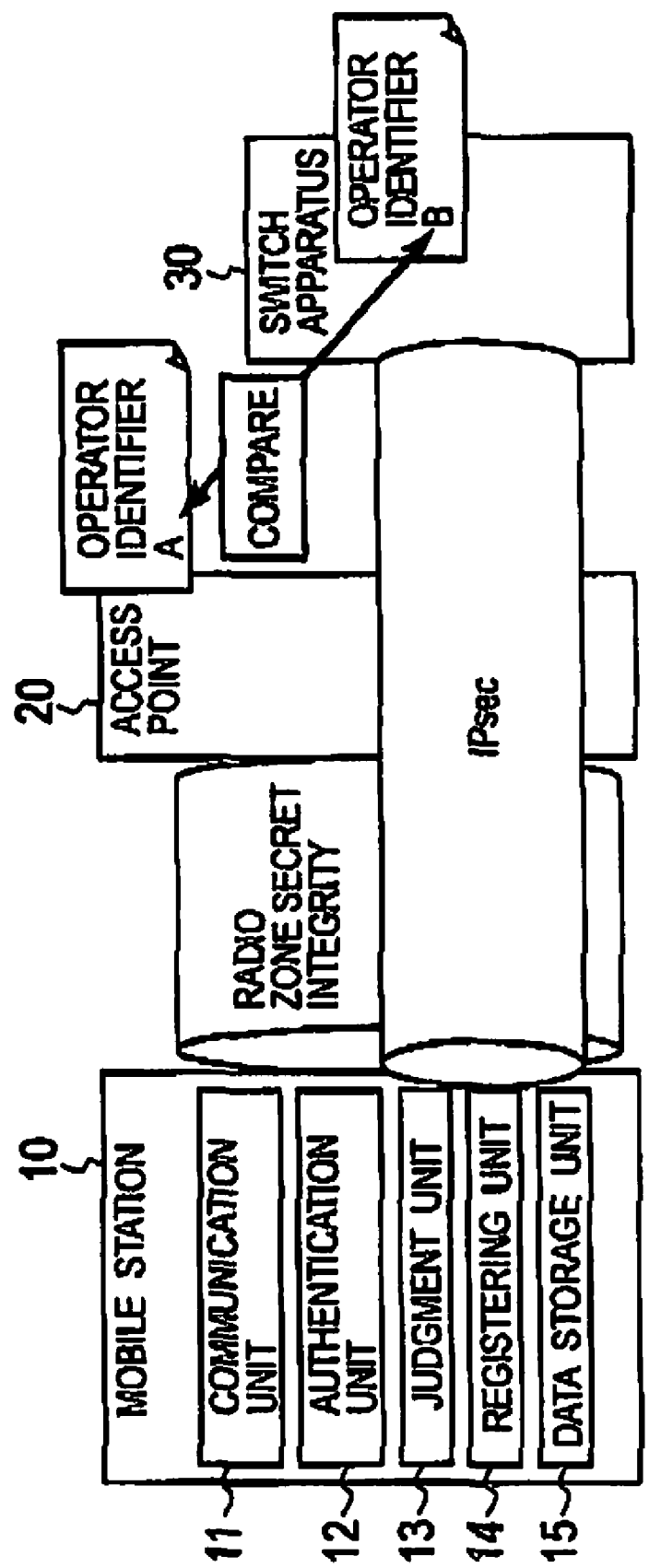
FIG. 1 is a diagram showing a configuration of a communication system according to a first embodiment of the present invention.

Next, embodiments of the present invention are described with reference to the accompanying drawings. In the following descriptions of the drawings, the same or similar elements are denoted by the same or similar reference numerals. However, it should be noted that the drawings are schematic.

In the embodiments of the present invention, the following description is given for an example in which a mobile station or a switch apparatus (an IMS apparatus) detects that a security is already ensured for a communication path between the mobile station and the switch apparatus, and skips an encryption process of the IMS.

First Embodiment

In a first embodiment, the following description is given for an example in which the mobile station detects that an operator apparatus of a radio access system that the mobile station uses, and an operator apparatus of an IMS apparatus are the same.
(Communication System)

As shown in FIG. 1, a communication system in accordance with this embodiment includes a mobile station 10, an access point 20 (e.g., a base station) located on a radio access system, and a switch apparatus 30 (e.g., an IMS apparatus) connected to the radio access system. In this communication system, it is assumed that a secured (a secret/an integrity) connection is established between the mobile station 10 and the access point 20.

The access point 20 stores an identifier (e.g., an operator identifier A) which uniquely identifies an apparatus controlling the radio access system. Further, the switch apparatus 30 stores an identifier (e.g., an operator identifier B) which uniquely identifies an apparatus controlling a switch apparatus.

As shown in FIG. 1, the mobile station includes a communication unit 11, an authentication unit 12, a judgment unit 13, a registering unit 14, and a data storage unit 15.

The communication unit 11 performs a communication with the access point 20 and the switch apparatus 30, and performs a transmission/reception of a secret key and a signal of various kinds.

The authentication unit 12 performs an authentication between the mobile station 10 and the access point 20, and an authentication between the mobile station 10 and the switch apparatus 30.

The judgment unit 13 judges whether or not to establish a secured connection between the mobile station 10 and the switch apparatus 30. To be more precise, the judgment unit 13 judges whether or not to establish the connection by comparing the identifier (e.g., the operator identifier A) which uniquely identifies the apparatus controlling the radio access system and the identifier (e.g., the operator identifier B) which uniquely identifies the apparatus controlling the switch apparatus.

The registering unit 14 performs a SIP registration on the switch apparatus 30.

The data storage unit 15 stores the secret key, the integrity key, the operator identifier, data in the middle of a transmission, and the like, which are received.
(Communication Method)

Next, a communication method in accordance with the first embodiment is described with reference to FIG. 2.

First, the access point 20 stores the identifier (e.g., an operator identifier A) which uniquely identifies the apparatus controlling the radio access system (S101), and the switch apparatus 30 (e.g., a P-CSCF 30a) stores the identifier (e.g., an operator identifier B) which uniquely identifies the apparatus controlling the switch apparatus (S102).

Next, the mobile station 10 performs the authentication with the access point 20 located on the radio access system, so as to exchange the secret key and the integrity key (S103). At this time, the access point 20 transmits the operator identifier A to the mobile station 10, and the mobile station 10 stores the operator identifier A.

Next, the mobile station 10 stores an algorithm for the secret and the Integrity to be used in a radio zone (S104). Here, the secured connection is established between the mobile station 10 and the access point 20 located on the radio access system.

Subsequently, the mobile station 10 transmits an operator identifier request to the P-CSCF 30a (S105), and the P-CSCF 30a transmits an operator identifier response, including the operator identifier B, to the mobile station 10 (S106). Thereafter, the mobile station 10 judges whether or not to establish the secured connection between the mobile station 10 and the switch apparatus 30 by comparing the operator identifier A and the operator identifier B (S107). Here, when the operator identifier A and the operator identifier B are the same, the mobile station 10 judges that the apparatus controlling the radio access system, and the switch apparatus 30 are the same. Thus, the mobile station 10 judges that establishing the secured connection between the mobile station 10 and the switch apparatus 30 is unnecessary. Incidentally, the following processes described herein below are performed when the connection is unnecessary. When the connection is necessary, the connection is established by performing the same procedure as a conventional procedure.

Further, the mobile station 10 transmits a user ID, an authentication request, an IPsec unnecessary notification, and the like to the P-CSCF 30a so as to perform the SIP registration (S108). Next, the P-CSCF 30a transmits the user ID, the authentication request, and the like to the S-CSCF 30b so as to perform the SIP registration (S109), and the S-CSCF 30b transmits a random number, a secret key, an integrity key, and the like to the P-CSCF 30a so as to perform an authentication challenge (S110). Subsequently, the P-CSCF 30a stores the secret key and the integrity key (S111).

Next, the P-CSCF 30a transmits the random number, an IPsec unnecessary reception response, and the like to the mobile station 10 so as to perform the authentication challenge (S112). Thereafter, the mobile station 10 transmits the user ID, a challenge response, and the like to the P-CSCF 30a so as to perform the SIP registration (S113), and the P-CSCF 30a transmits the user ID, the challenge response, and the validity of the IPsec secret and the integrity to the S-CSCF 30b so as to perform the SIP registration (S114). Next, the S-CSCF 30b transmits the validity of the authentication to the P-CSCF 30a (S115), and the P-CSCF 30a transmits the validity of the authentication to the mobile station 10.

(Operation and Effects)

In accordance with the communication system, the mobile station 10, and the communication method according to the first embodiment, the mobile station 10 judges whether or not to establish the secured connection between the mobile station 10 and the switch apparatus 30, by comparing the identifier (e.g., the operator identifier A) which uniquely identifies the apparatus controlling the radio access system and the identifier (e.g., the operator identifier B) which uniquely identifies the apparatus controlling the switch apparatus. When the operator identifier A and the operator identifier B are the same, the secured connection is already established between the access point 20 located on the radio access system and the switch apparatus 30. Accordingly, the mobile station 10 judges that establishing a new connection is unnecessary.

Therefore, in accordance with the communication system, the mobile station 10, and the communication method according to the first embodiment, it is possible to skip an encryption process of the IMS and to eliminate an unnecessary encryption process. Therefore, it is possible to shorten the time of a connection delay and to reduce a process load on the mobile station and the network.

Second Embodiment

In the first embodiment, the mobile station 10 compares the operator identifier stored by the access point 20 and the operator identifier stored by the switch apparatus 30; however in a second embodiment, a description is given for an example in which a comparison is made using an operator identifier list stored by the mobile station 10 and, thereby, the mobile station 10 judges whether or not to establish a connection.

(Communication System)

Figures 3, 4:
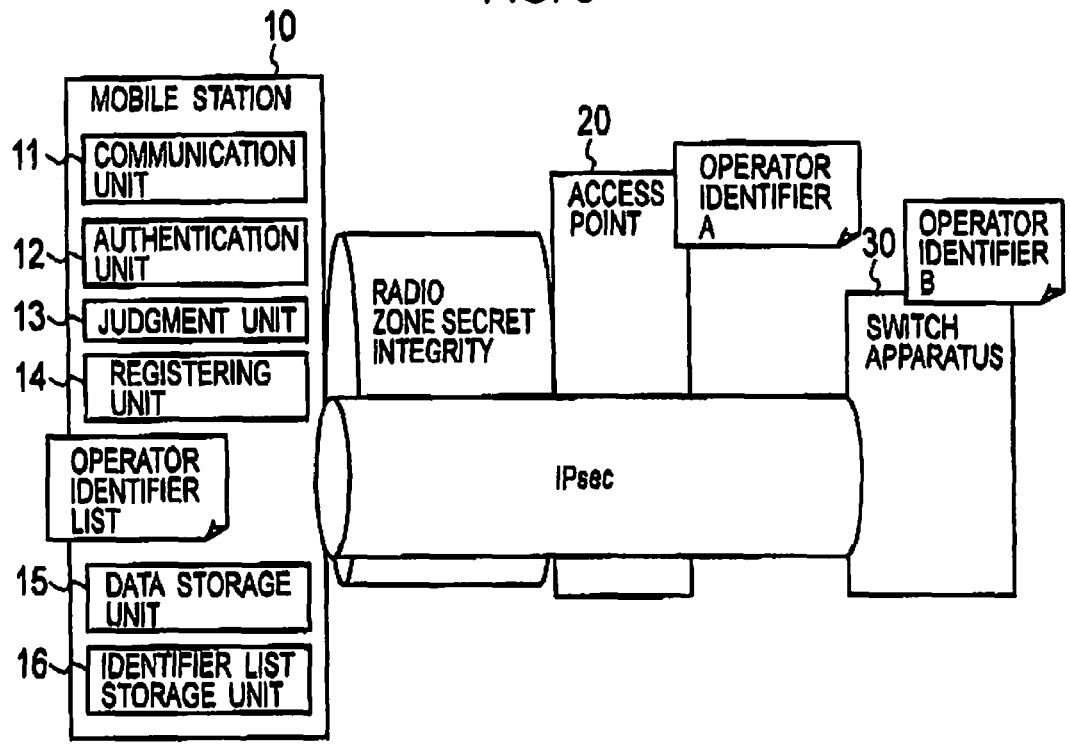
FIG. 3 is a diagram showing a configuration of a communication system according to a second embodiment of the present invention.
FIG. 4 is an example of an operator identifier list according to the second embodiment of the present invention.

As shown in FIG. 3, a communication system according to the second embodiment includes a mobile station 10, an access point 20 (e.g., a base station) located on a radio access system, and a switch apparatus 30 (e.g., an IMS apparatus) connected to the radio access system. In this communication system, it is assumed that a secured (a secret/an integrity) connection is established between the mobile station 10 and the access point 20.

The access point 20 stores an identifier (e.g., an operator identifier A) which uniquely identifies an apparatus controlling a radio access system. Further, the switch apparatus 30 stores an identifier (e.g., an operator identifier B) which uniquely identifies an apparatus controlling the switch apparatus.

As shown in FIG. 3, the mobile station 10 includes a communication unit 11, an authentication unit 12, a judgment unit 13, a registering unit 14, a data storage unit 15, and an identifier list storage unit 16.

The identifier list storage unit 16 stores an identifier list being a combination of the identifier which uniquely identifies the apparatus controlling the radio access system (access point 20), in which a security is ensured or not ensured, and the identifier which uniquely identifies the apparatus controlling the switch apparatus 30. Here, "the security is ensured" means that apparatuses (the access point 20, the switch apparatus 30) making a communication, and a transmission path connecting the both apparatuses are physically secured.

As shown in FIG. 4, the operator identifier list can be set that the security is ensured even when the operator identifier (e.g., an operator Y) of the radio access system (the access point 20) and the operator identifier (e.g., an operator X) of the switch apparatus 30 are not the same, and that a new security connection (IPsec) is unnecessary.

The judgment unit 13 judges whether or not to establish the secured connection between the mobile station 10 and the switch apparatus 30. More specifically, the judgment unit 13 judges whether or not to establish the connection by comparing the identifier list with the identifier (e.g., an operator identifier A) which uniquely identifies the apparatus controlling the radio access system, and the identifier (e.g., an operator identifier B) which uniquely identifies the apparatus controlling the switch apparatus 30.

The communication unit 11, the authentication unit 12, the registering unit 14, and the data storage unit 15 are the same as those of the first embodiment, so that further description thereof is omitted herein.

(Communication Method)

Figure 5:
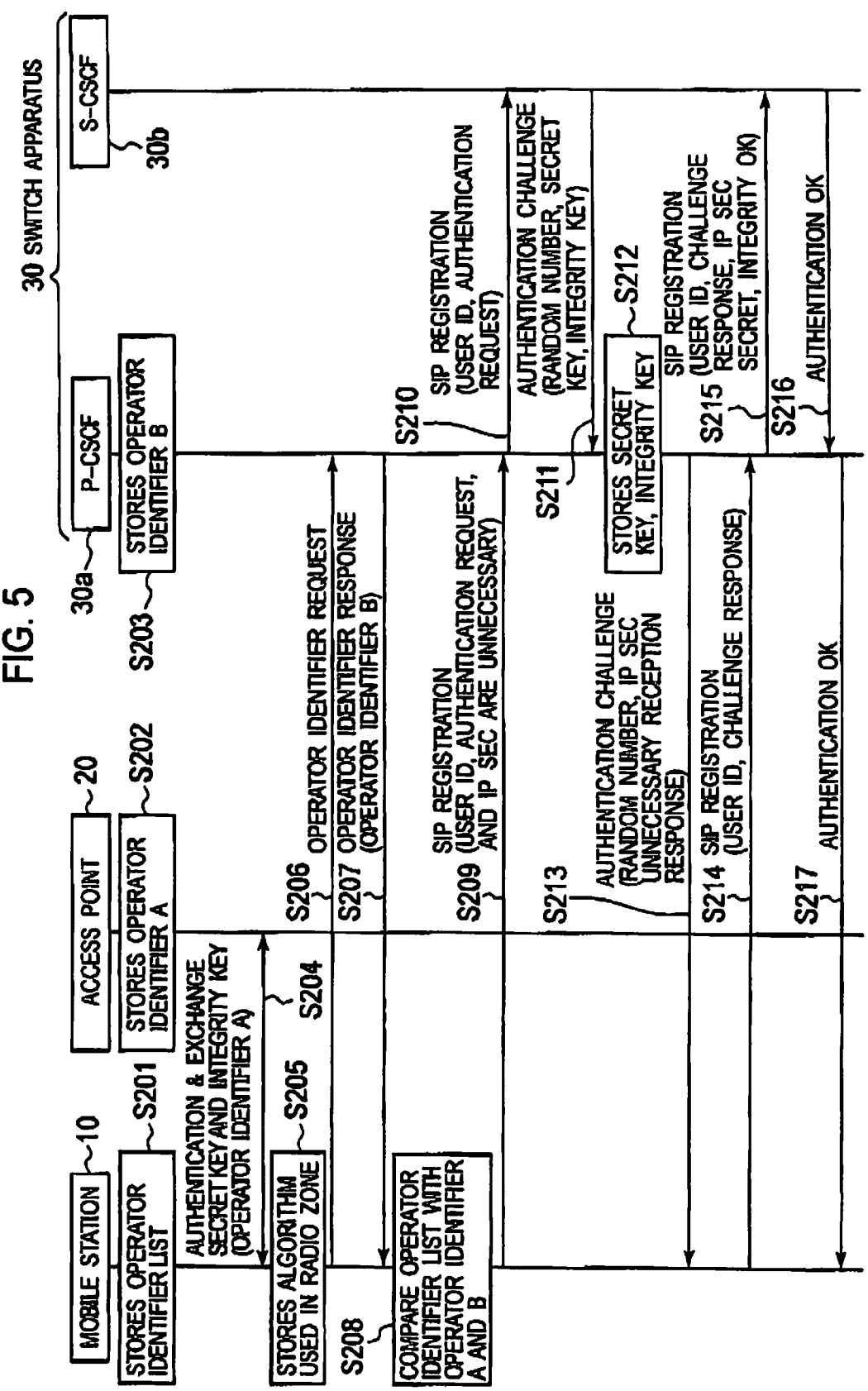
FIG. 5 is a sequence diagram showing a communication method according to the second embodiment of the present invention.

Next, a communication method according to the second embodiment is described with reference to FIG. 5.

First, the mobile station 10 stores the operator identifier list (S201); the access point 20 stores the identifier (e.g., an operator identifier A) which uniquely identifies the apparatus controlling the radio access system (S202); and the switch apparatus 30 (e.g., an P-CSCF 30a) stores the identifier (e.g., an operator identifier B) which uniquely identifies the apparatus controlling the switch apparatus (S203).

Next, the mobile station 10 performs an authentication with the access point 20 located on the radio access system, so as to exchange the secret key and the integrity key (S204). At this time, the access point 20 transmits the operator identifier A to the mobile station 10, and the mobile station 10 stores the operator identifier A.

Next, the mobile station 10 stores an algorithm for the secret and the integrity to be used in a radio zone (S205). Here, the secured connection is established between the mobile station 10, and the access point 20 located on the radio access system.

Next, the mobile station 10 transmits an operator identifier request to the P-CSCF 30a (S206), and the P-CSCF 30a transmits an operator identifier response, including the operator identifier B, to the mobile station 10 (S207). Thereafter, the mobile station 10 judges whether or not to establish the secured connection between the mobile station 10 and the switch apparatus 30 by comparing the identifier list with the operator identifier A and the operator identifier B (S208). Here, for example, the mobile station 10 refers to the identifier list shown in FIG. 4. When the operator identifier A is "operator Y" and when the operator identifier B is "operator X", the mobile station 10 judges that the security is ensured so that a new security connection (IPsec) is unnecessary. Incidentally, the processes described herein below are performed when it is judged that the connection is unnecessary, when the connection is necessary, the connection is established by performing the same procedure as a conventional procedure.

Figure 2:
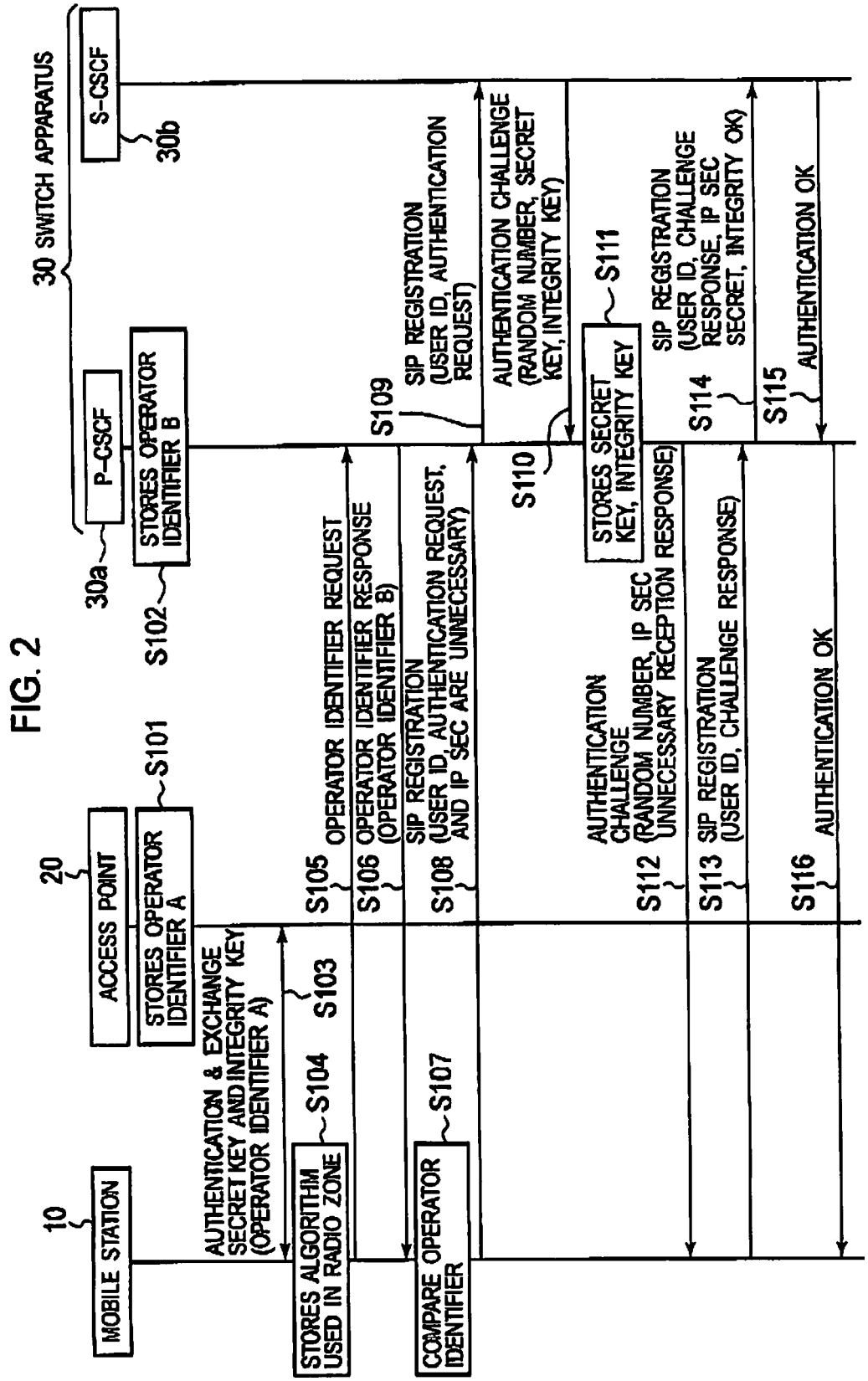
FIG. 2 is a sequence diagram showing a communication method according to the first embodiment of the present invention.

Meanwhile, processes of steps S209 to S217 are the same as those of steps S108 to S116 shown in FIG. 2, so that further description thereof. Is omitted.

(Operation and Effects)

In accordance with the communication system, the mobile station 10, and the communication method according to the second embodiment, the mobile station 10 judges whether or not to establish the secured connection between the mobile station 10 and the switch apparatus 30 by comparing the operator identifier list with the identifier (e.g., the operator identifier A) which uniquely identifies the apparatus controlling the radio access system and the identifier (e.g., the operator identifier B) which uniquely identifies an apparatus controlling a switch apparatus (e.g., refer to FIG. 4).

Therefore, in accordance with the communication system, the mobile station 10, and the communication method according to the second embodiment, it is possible to skip an encryption process of the IMS and to eliminate an unnecessary encryption process. Therefore, it is possible to shorten the time of a connection delay and to reduce a process load on the mobile station and the network.

Further, in the second embodiment, it is possible to arbitrarily rewrite the operator identifier list, and to flexibly judge whether an establishment of a connection is existed.

Third Embodiment

In the first embodiment, the mobile station 10 compares the operator identifier stored by the access point 20 and the operator identifier stored by the switch apparatus 30; however, in a third embodiment, a description is given for an example in which the mobile station 10 stores an identifier which uniquely identifies an apparatus controlling the switch apparatus 30, and compares this identifier with an operator identifier stored by the access point 20, and thereby, the mobile station 10 judges whether or not to establish a connection.
(Communication System)

Figure 6:
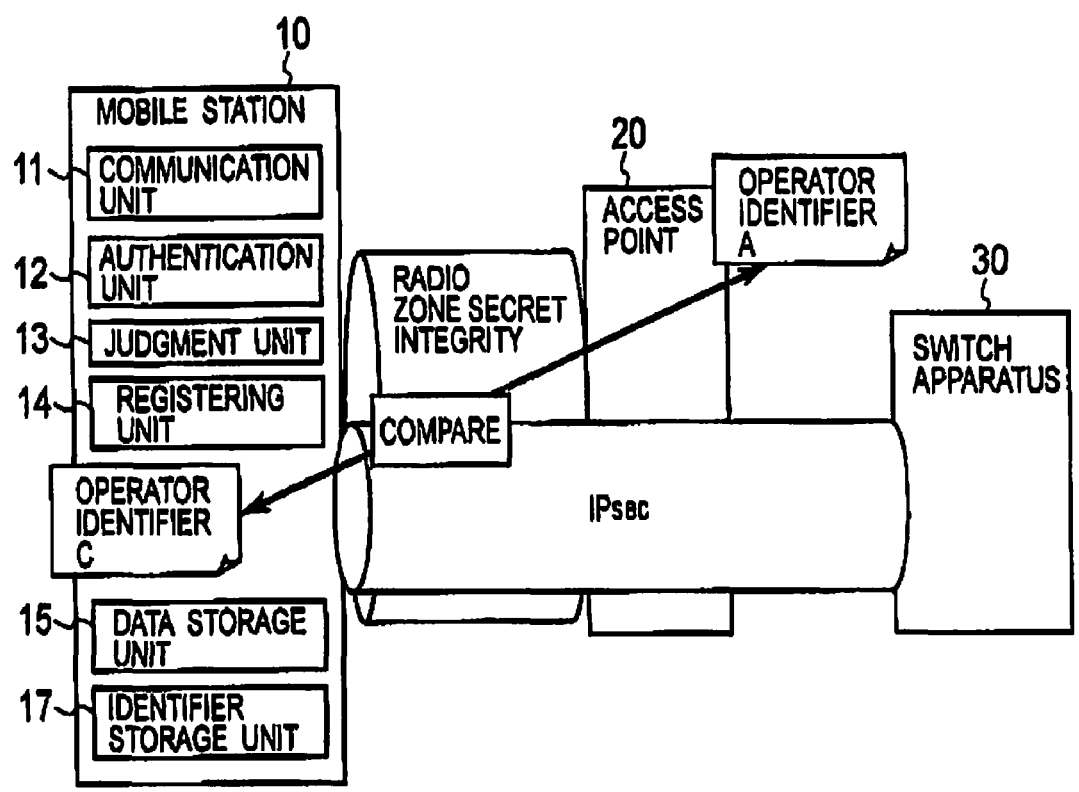
FIG. 6 is a diagram showing a configuration of a communication system according to a third embodiment of the present invention.

As shown in FIG. 6, a communication system in accordance with the third embodiment includes a mobile station 10, an access point 20 (e.g., a base station) located on a radio access system, and a switch apparatus 30 (e.g., an IMS apparatus) connected to the radio access system. In this communication system, it is assumed that a secured (a secret/an integrity) connection is established between the mobile station 10 and the access point 20.

The access point 20 stores an identifier (e.g., an operator identifier A) which uniquely identifies an apparatus controlling the radio access system.

As shown in FIG. 6, the mobile station 10 includes a communication unit 11, an authentication unit 12, a judgment unit 13, a registering unit 14, a data storage unit 15, and an identifier storage unit 17.

The identifier storage unit 17 stores the identifier (e.g., an operator identifier C) which uniquely identifies the apparatus controlling the switch apparatus 30.

The judgment unit 13 judges whether or not to establish the secured connection between the mobile station 10 and the switch apparatus 30. To be more precise, the judgment unit 13 judges whether or not to establish the connection by comparing the identifier (e.g., an operator identifier C) stored by the identifier storage unit 17 and the identifier (e.g., an operator identifier A) which uniquely identifies the apparatus controlling the radio access system.

The communication unit 11, the authentication unit 12, the registering unit 14, and the data storage unit 15 are the same as those of the first embodiment, so that further description thereof is herein omitted.
(Communication Method)

Figure 7:
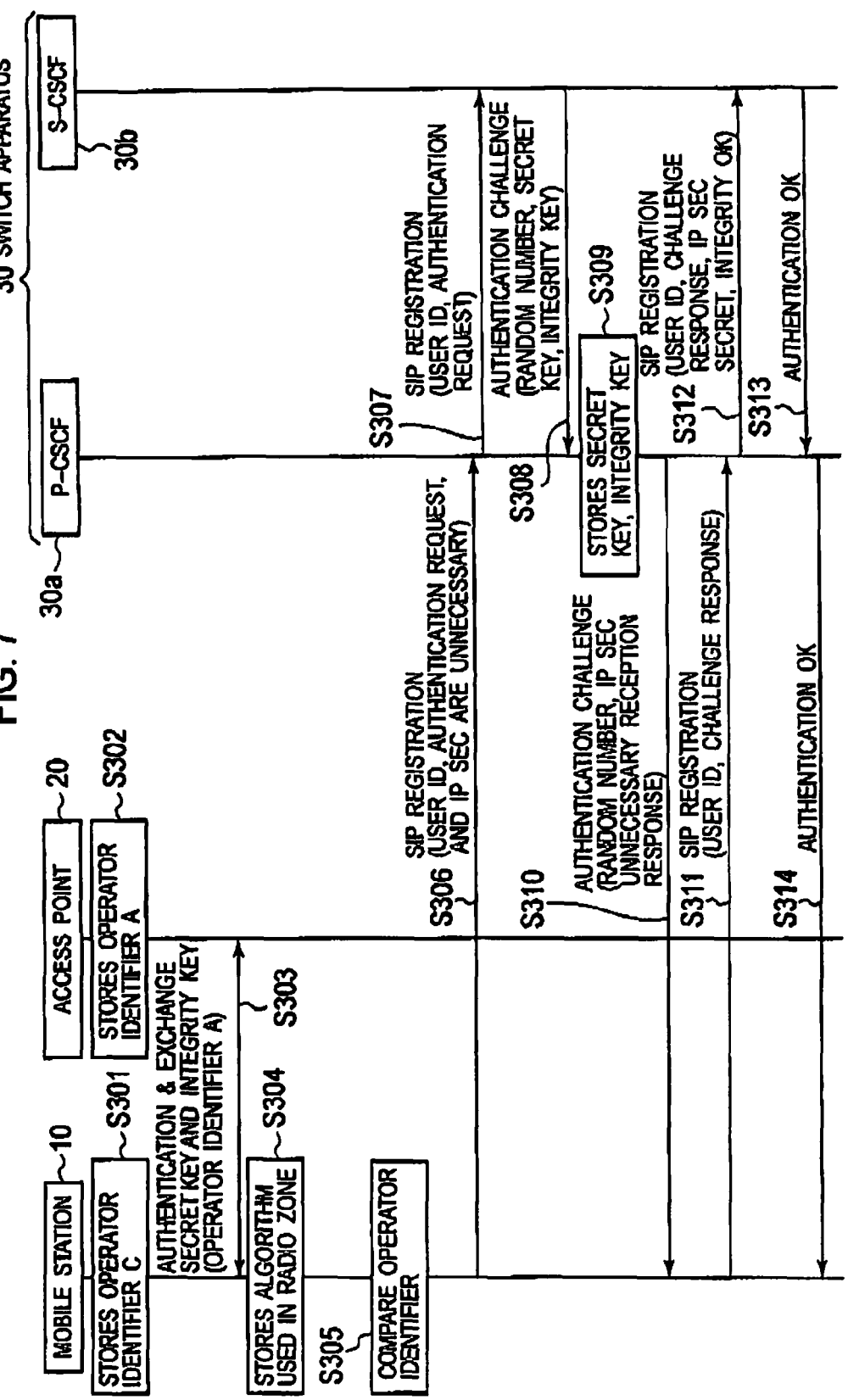
FIG. 7 is a sequence diagram showing a communication method according to the third embodiment of the present invention.

Next, a communication method in accordance with the third embodiment is described with reference to FIG. 7.

First, the mobile station 10 stores the identifier (e.g., the operator identifier C) which uniquely identifies the apparatus controlling the switch apparatus 30 (S301), and the access point 20 stores the identifier (e.g., the operator identifier A) which uniquely identifies the apparatus controlling the radio access system (S302).

Next, the mobile station 10 performs an authentication with the access point 20 located on the radio access system, so as to exchange a secret key and an integrity key (S303). At this time, the access point 20 transmits the operator identifier A to the mobile station 10, and the mobile station 10 stores the operator identifier A.

Next, the mobile station 10 stores an algorithm for the secret and the integrity to be used in a radio zone (S304). Here, the secured connection is established between the mobile station 10, and the access point 20 located on the radio access system.

Subsequently, the mobile station 10 judges whether or not to establish the secured connection between the mobile station 10 and the switch apparatus 30 by comparing the operator identifier C and the operator identifier A (S305). Here, when the operator identifier C and the operator identifier A are the same, the mobile station 10 judges that the apparatus controlling the radio access system, and the apparatus controlling the switch apparatus 30 are the same, so that the mobile station 10 judges that establishing the secured connection is unnecessary. Incidentally, the processes described herein below are performed when it is judged that the connection is unnecessary, when the connection is necessary, the connection is established by performing the same procedure as a conventional procedure.

Meanwhile, processes of steps S306 to S314 are the same as those of steps S108 to S116 shown in FIG. 2, so that further description thereof. Is omitted.
(Operation and Effects)

In accordance with the communication system, the mobile station 10, and the communication method according to the third embodiment, the mobile station 10 judges whether or not to establish the secured connection between the mobile station 10 and the switch apparatus 30 by comparing the identifier (e.g., the operator identifier C) which uniquely identifies the apparatus controlling the switch apparatus stored in the mobile station and the identifier (e.g., the operator identifier A) which uniquely identifies the apparatus controlling the radio access system.

Therefore, in accordance with the communication system, the mobile station 10, and the communication method according to the third embodiment, it is possible to skip an encryption process of the IMS and to eliminate an unnecessary encryption process. Therefore, it is possible to shorten the time of a connection delay and to reduce a process load on the mobile station and the network.

Further, in comparison with the first embodiment, in the third embodiment, it is unnecessary to receive the operator identifier from the switch apparatus 30, so it is possible to shorten the time of the connection delay and reduce the process load on the mobile station and the switch apparatus, even more.

Fourth Embodiment

In the first embodiment, the mobile station 10 compares the operator identifier stored by the access point 20 and the operator identifier stored by the switch apparatus 30; however, in a fourth embodiment, a description is given for an example in which, in addition to the above comparison, algorithms are compared to judge whether or not to establish a connection.
(Communication System)

Figures 8, 9:
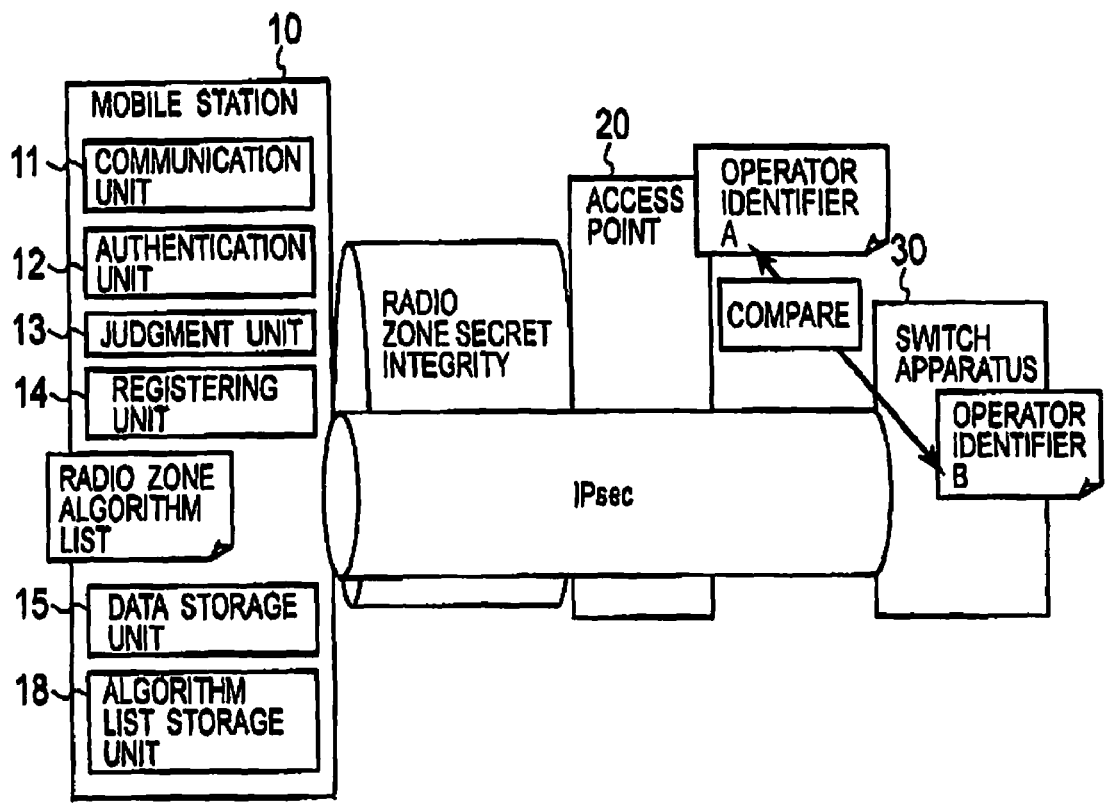
FIG. 8 is a diagram showing a configuration of a communication system according to a fourth embodiment of the present invention.
FIG. 9 is an example or a radio zone algorithm list according to the fourth embodiment of the present invention.

As shown in FIG. 8, a communication system according to the fourth embodiment includes a mobile station 10, an access point 20 (e.g., a base station) located on a radio access system, and a switch apparatus 30 (e.g., an IMS apparatus) connected to the radio access system. In this communication system, it is assumed that a secured (a secret/an integrity) connection is established between the mobile station 10 and the access point 20.

The access point 20 stores an identifier (e.g., an operator identifier A) which uniquely identifies an apparatus controlling a radio access system. Further, the switch apparatus 30 stores an identifier (e.g., an operator identifier B) which uniquely identifies an apparatus controlling the switch apparatus.

As shown in FIG. 8, the mobile station 10 includes a communication unit 11, an authentication unit 12, a judgment unit 13, a registering unit 14, a data storage unit 15, and an algorithm storage unit 18.

As shown in FIG. 9, the algorithm storage unit 18 stores, as a radio zone algorithm list, a secured algorithm used in the radio system or a non-secured algorithm used in the radio access system. As shown in FIG. 9, for example, in the radio zone, when a secret is an AES and when an integrity algorithm is an SHA-1, a security is ensured, and a new security connection (IPsec) is set to be unnecessary.

The judgment unit 13 judges whether or not to establish the secured connection between the mobile station 10 and the switch apparatus 30. To be more precise, the judgment unit 13 judges whether or not to establish the connection by comparing the identifier (e.g., an operator identifier A) which uniquely identifies the apparatus controlling the radio access system and the identifier (e.g., an operator identifier B) which uniquely identifies the apparatus controlling the switch apparatus, and by comparing the algorithm used in the radio access system, and the algorithm list.

The communication unit 11, the authentication unit 12, the registering unit 14, and the data storage unit 15 are the same as those of the first embodiment, so that further description thereof is herein omitted.

(Communication Method)

Figure 10:
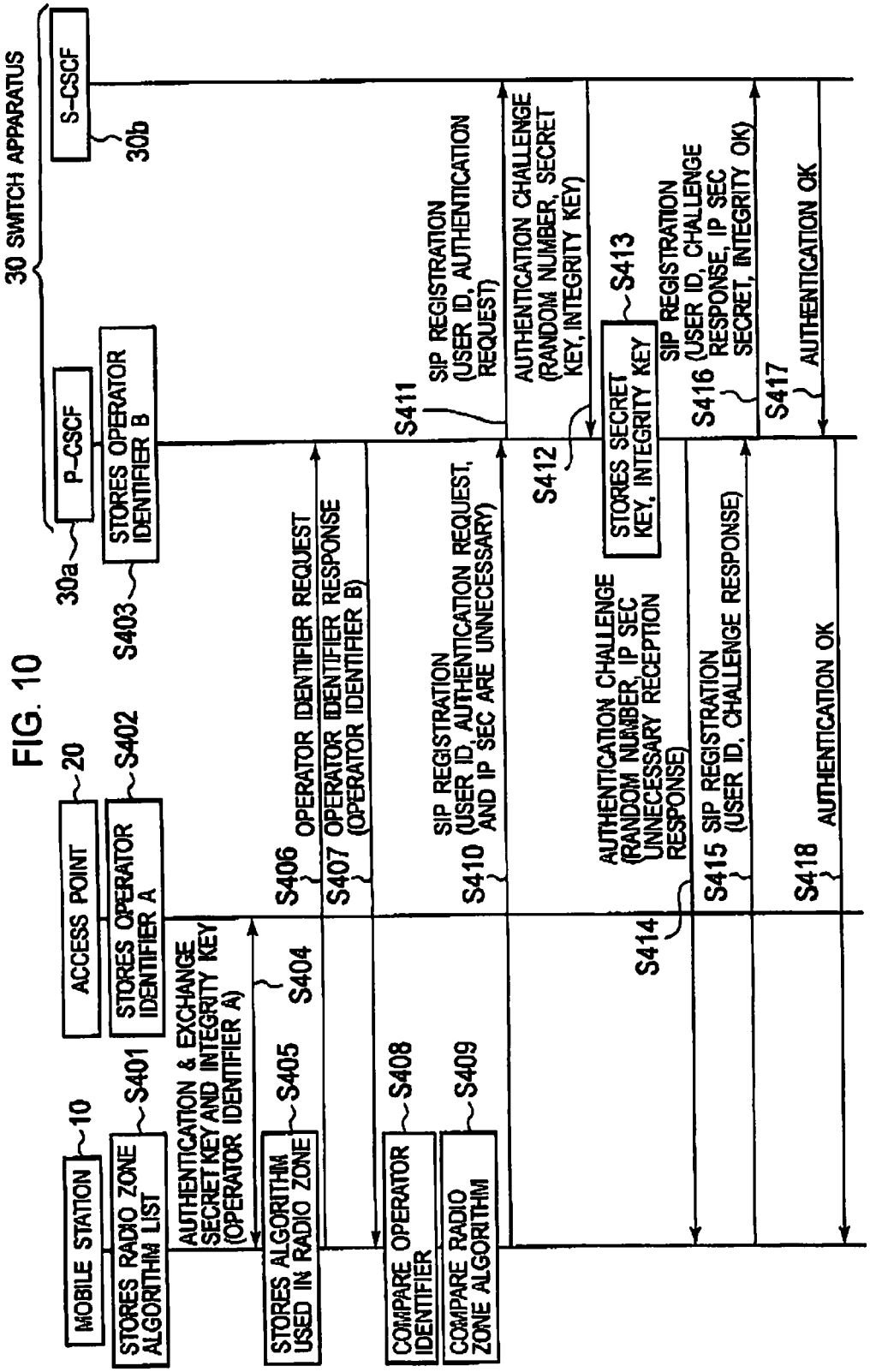
FIG. 10 is a sequence diagram showing a communication method according to the fourth embodiment of the present invention.

Next, a communication method in accordance with the fourth embodiment is described with reference to FIG. 10.

First, the mobile station 10 stores a radio zone algorithm list (S401); the access point 20 stores the identifier (e.g., an operator identifier A) which uniquely identifies the apparatus controlling the radio access system (S402); and the switch apparatus 30 stores the identifier (e.g., an operator identifier B) which uniquely identifies the apparatus controlling the switch apparatus 30 (S403).

Next, the mobile station 10 performs an authentication with the access point 20 located on the radio access system, so as to exchange that a secret key and an integrity key (S404). At this time, the access point 20 transmits the operator identifier A to the mobile station 10, and the mobile station 10 stores the operator identifier A.

Next, the mobile station 10 stores an algorithm for the secret and the Integrity to use in the radio zone (S405). Here, the secured connection is established between the mobile station 10 and the access point 20 located on the radio access system.

Next, the mobile station 10 transmits an operator identifier request to the P-CSCF 30a (S406), and the P-CSCF 30a transmits an operator identifier response, including the operator identifier B, to the mobile station 10 (S407). Thereafter, the mobile station 10 compares the operator identifier A and the operator identifier B (S408). Subsequently, the mobile station 10 compares the algorithm used in the radio access system and the algorithm list (S409). Here, when the operator identifier A and the operator identifier B are the same, and also when the algorithm used in the radio access system is set so as unnecessary an IPsec in the algorithm list, the mobile station 10 judges that establishing the secured connection is unnecessary. Incidentally, the processes described herein below are performed when it is judged that the connection is unnecessary, when the connection is necessary, the connection is established by performing the same procedure as a conventional procedure.

Meanwhile, processes of steps S410 to S418 are the same as those of steps S108 to S116 shown in FIG. 2, so that further description thereof is omitted.

(Operation and Effects)

In accordance with the communication system, the mobile station 10, and the communication method according to the fourth embodiment, the mobile station 10 judges whether or not to establish the secured connection between the mobile station 10 and the switch apparatus 30 by comparing the identifier (e.g., the operator identifier A) which uniquely identifies the apparatus controlling the radio access system, and the identifier (e.g., the operator identifier B) which uniquely identifies the apparatus controlling the switch apparatus, and by comparing the algorithm used in the radio access system and the algorithm list, and thereby.

Therefore, in accordance with the communication system, the mobile station 10, and the communication method according to the fourth embodiment, it is possible to skip an encryption process of the IMS and to eliminate an unnecessary encryption process. Therefore, it is possible to shorten the time of a connection delay and to reduce a process load on the mobile station and the network.

Further, in the fourth embodiment, algorithms in the radio zone are compared, so that when a strong security connection is established, a finer control becomes possible in such a way that a new connection is not established between the mobile station 10 and the switch apparatus 30.

Fifth Embodiment

In the second embodiment, the mobile station 10 compares the operator identifier stored by the access point 20, the operator identifier stored by the switch apparatus 30, and the operator identifier list; however, in a fifth embodiment, a description is given for an example in which, in addition to the above comparison, algorithms are compared to judge whether or not to establish a connection.

(Communication System)

Figure 11:
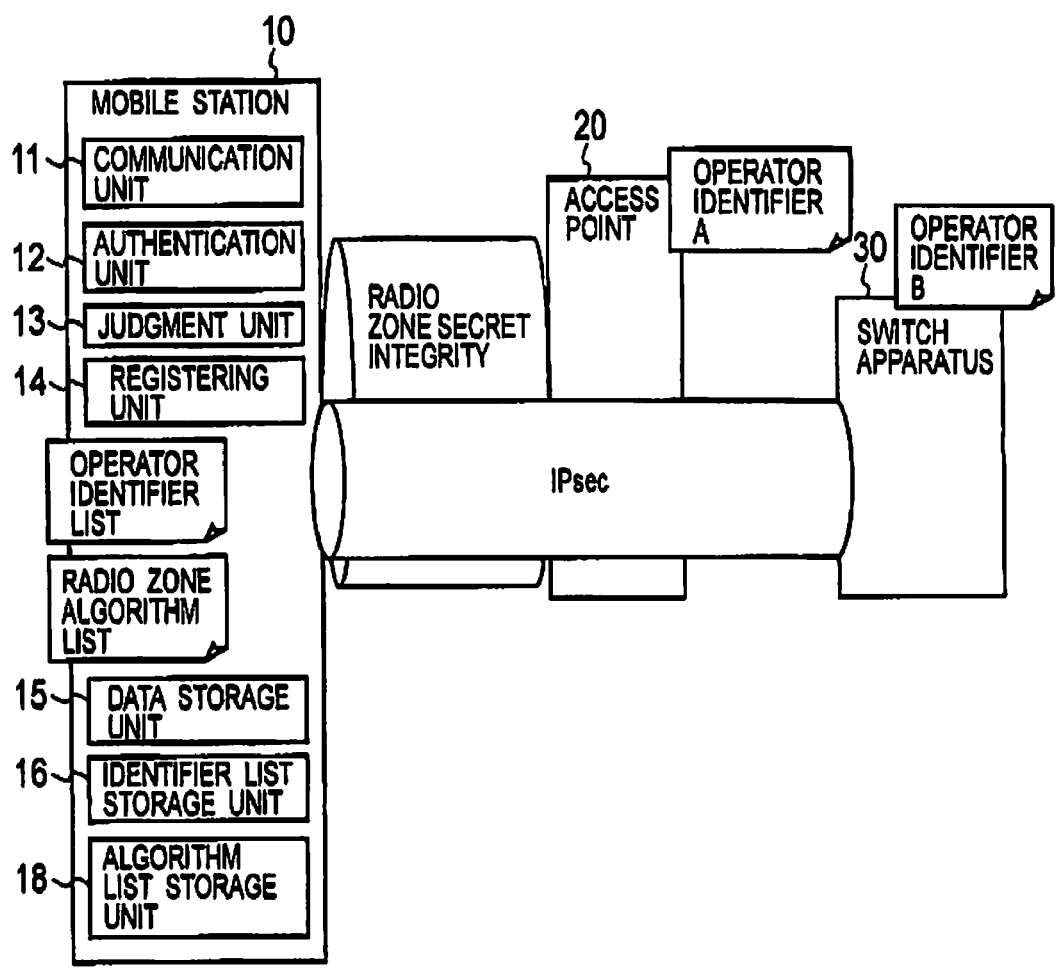
FIG. 11 is a diagram showing a configuration of a communication system according to a fifth embodiment of the present invention.

As shown in FIG. 11, a communication system according to the fifth embodiment includes a mobile station 10, an access point 20 (e.g., a base station) located on a radio access system, and a switch apparatus 30 (e.g., an IMS apparatus) connected to the radio access system. In this communication system, it is assumed that a secured (a secret/an integrity) connection 18 established between the mobile station 10 and the access point 20.

The access point 20 stores an identifier (e.g., an operator identifier A) which uniquely identifies an apparatus controlling a radio access system. Further, the switch apparatus 30 stores an identifier (e.g., an operator identifier B) which uniquely identifies an apparatus controlling the switch apparatus.

As shown in FIG. 11, the mobile station 10 includes a communication unit 11, an authentication unit 12, a judgment unit 13, a registering unit 14, a data storage unit 15, an identifier list storage unit 16, and an algorithm list storage unit 18.

The judgment unit 13 judges whether or not to establish the secured connection between the mobile station 10 and the switch apparatus 30. To be more precise, the judgment unit 13 judges whether or not to establish the connection by comparing an identifier list with the identifier (e.g., an operator identifier A) which uniquely identifies the apparatus controlling the radio access system, and the identifier (e.g., an operator identifier B) which uniquely identifies the apparatus controlling the switch apparatus; and by comparing the algorithm used in the radio access system and an algorithm list.

The identifier list storage unit 16 is the same as that of the second embodiment so that further description thereof is herein omitted. In addition, the algorithm storage unit 18 is the same as that of the fourth embodiment so that further description thereof is herein omitted.

The communication unit 11, the authentication unit 12, the registering unit 14, and the data storage unit 15 are the same as those of the first embodiment, so that further description thereof is herein omitted.

(Communication Method)

Figure 12:
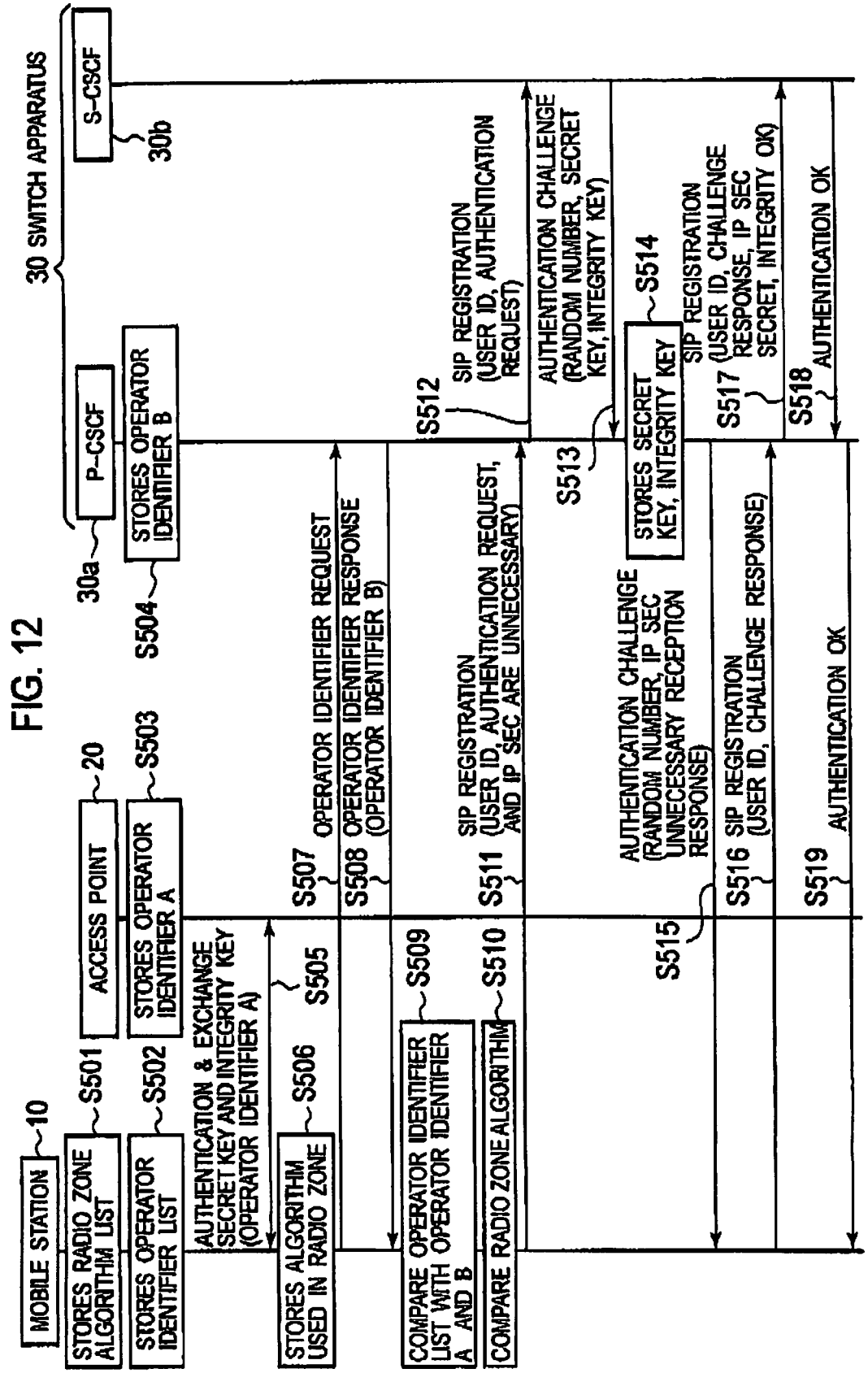
FIG. 12 is a sequence diagram showing a communication method according to the fifth embodiment of the present invention.

Next, a communication method in accordance with the fifth embodiment is described with reference to FIG. 12.

First, the mobile station 10 stores a radio zone algorithm list (S501), and the operator identifier list (S502). Further, the access point 20 stores the identifier (e.g., an operator identifier A) which uniquely identifies the apparatus controlling the radio access system (S503), and the switch apparatus 30 stores the identifier (e.g., an operator identifier B) which uniquely identifies the apparatus controlling the switch apparatus 30 (S504).

Next, the mobile station 10 performs an authentication with the access point 20 located on the radio access system, so as to exchange a secret key and an integrity key (S505). At this time, the access point 20 transmits the operator identifier A to the mobile station 10, and the mobile station 10 stores the operator identifier A.

Next, the mobile station 10 stores an algorithm for the secret and the integrity to be used in the radio zone (S508). Here, the secured connection is established between the mobile station 10 and the access point 20 located on the radio access system.

Next, the mobile station 10 transmits an operator identifier request to the P-CSCF 30a (S507), and the P-CSCF 30a transmits an operator identifier response, including an operator identifier B, to the mobile station 10 (S508). Thereafter, the mobile station 10 compares the operator identifier list with the operator identifier A, and the operator identifier B (S509). Subsequently, the mobile station 10 compares the algorithm used in the radio access system and the algorithm list (S510). Here, when a combination of the operator identifier A and the operator identifier B is set so as unnecessary an IPsec in the operator identifier list, and also when the algorithm used in the radio access system is set so as unnecessary an IPsec in the algorithm list, the mobile station 10 judges that establishing the secured connection is unnecessary. Incidentally, the processes described herein below are performed when it is judged that the connection is unnecessary, when the connection is necessary, the connection is established by performing the same procedure as a conventional procedure.

Meanwhile, processes of steps S511 to S519 are the same as those of steps S108 to S116 shown in FIG. 2, so that further description thereof is herein omitted.

(Operation and Effects)

In accordance with the communication system, the mobile station 10, and the communication method according to the fifth embodiment, the mobile station 10 judges whether or not to establish the secured connection between the mobile station 10 and the switch apparatus 30 by comparing the operator identifier list with the identifier (e.g., the operator identifier A) which uniquely identifies the apparatus controlling the radio access system, and the identifier (e.g., the operator identifier B) which uniquely identifies the apparatus controlling the switch apparatus, and by comparing the algorithm used in the radio access system and the algorithm list.

Therefore, in accordance with the communication system, the mobile station 10, and the communication method according to the fifth embodiment, it is possible to skip an encryption process of the IMS and to eliminate an unnecessary encryption process. Therefore, it is possible to shorten the time of a connection delay and to reduce a process load on the mobile station and the network.

Further, in the fifth embodiment, it is possible to arbitrarily rewrite the operator identifier, and to flexibly judge whether an establishment of a connection is existed. In addition, algorithms in the radio zone are compared, so that when a strong security connection is established, a finer control becomes possible in such a way that a new connection is not established between the mobile station 10 and the switch apparatus 30.

Sixth Embodiment

In the third embodiment, the mobile station 10 stores the identifier which uniquely identifies the apparatus controlling the switch apparatus 30, and compares this identifier with an operator identifier that switch apparatus 30 stores; however, in a sixth embodiment, a description is given for an example in which, in addition to the above comparison, an algorithm list is compared to judge whether or not to establish a connection.

(Communication System)

Figure 13:
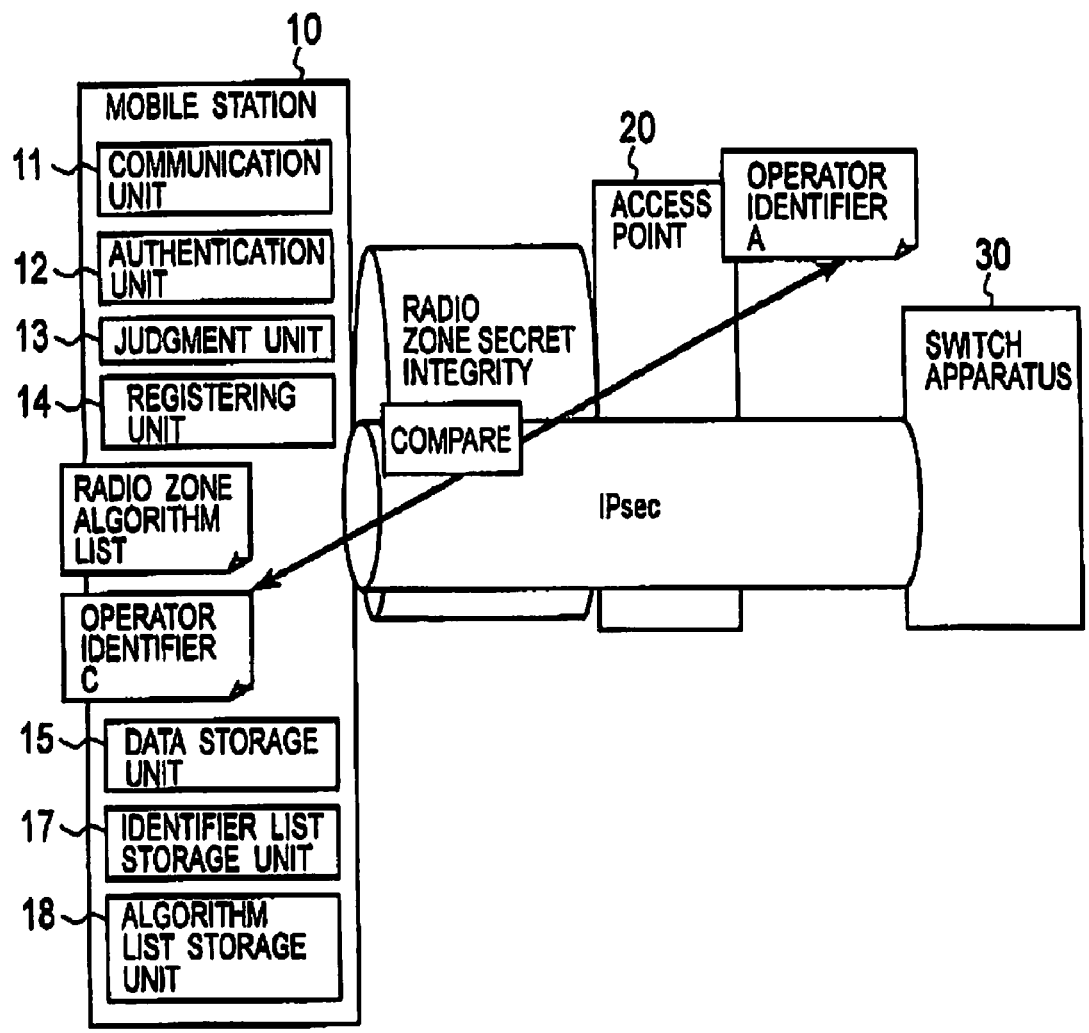
FIG. 13 is a diagram showing a configuration of a communication system according to a sixth embodiment of the present invention.

As shown in FIG. 13, a communication system according to the sixth embodiment includes a mobile station 10, an access point 20 (e.g., a base station) located on a radio access system, and a switch apparatus 30 (e.g., an IMS apparatus) connected to the radio access system. In this communication system, it is assumed that a secured (a secret/an integrity) connection is established between the mobile station 10 and the access point 20.

The access point 20 stores an identifier (e.g., an operator identifier A) which uniquely identifies an apparatus controlling the radio access system.

As shown in FIG. 13, the mobile station 10 includes a communication unit 11, an authentication unit 12, a judgment unit 13, a registering unit 14, a data storage unit 15, an identifier storage unit 17, and an algorithm list storage unit 18.

The judgment unit 13 judges whether or not to establish the secured connection between the mobile station 10 and the switch apparatus 30. To be more precise, the judgment unit 13 judges whether or not to establish the connection by comparing an identifier (e.g., an operator identifier C) stored by the identifier storage unit 17 and the identifier (e.g., an operator identifier A) which uniquely identifies the apparatus controlling the radio access system, and by comparing the algorithm used in the radio access system and the algorithm list.

The identifier storage unit 17 is the same as that of the third embodiment so that further description thereof is herein omitted. In addition, the algorithm storage unit 18 is the same as that of the fourth embodiment so that further description thereof is herein omitted.

The communication unit 11, the authentication unit 12, the registering unit 14, and the data storage unit 15 are the same as those of the first embodiment, so that further description thereof is herein omitted.

(Communication Method)

Figure 14:
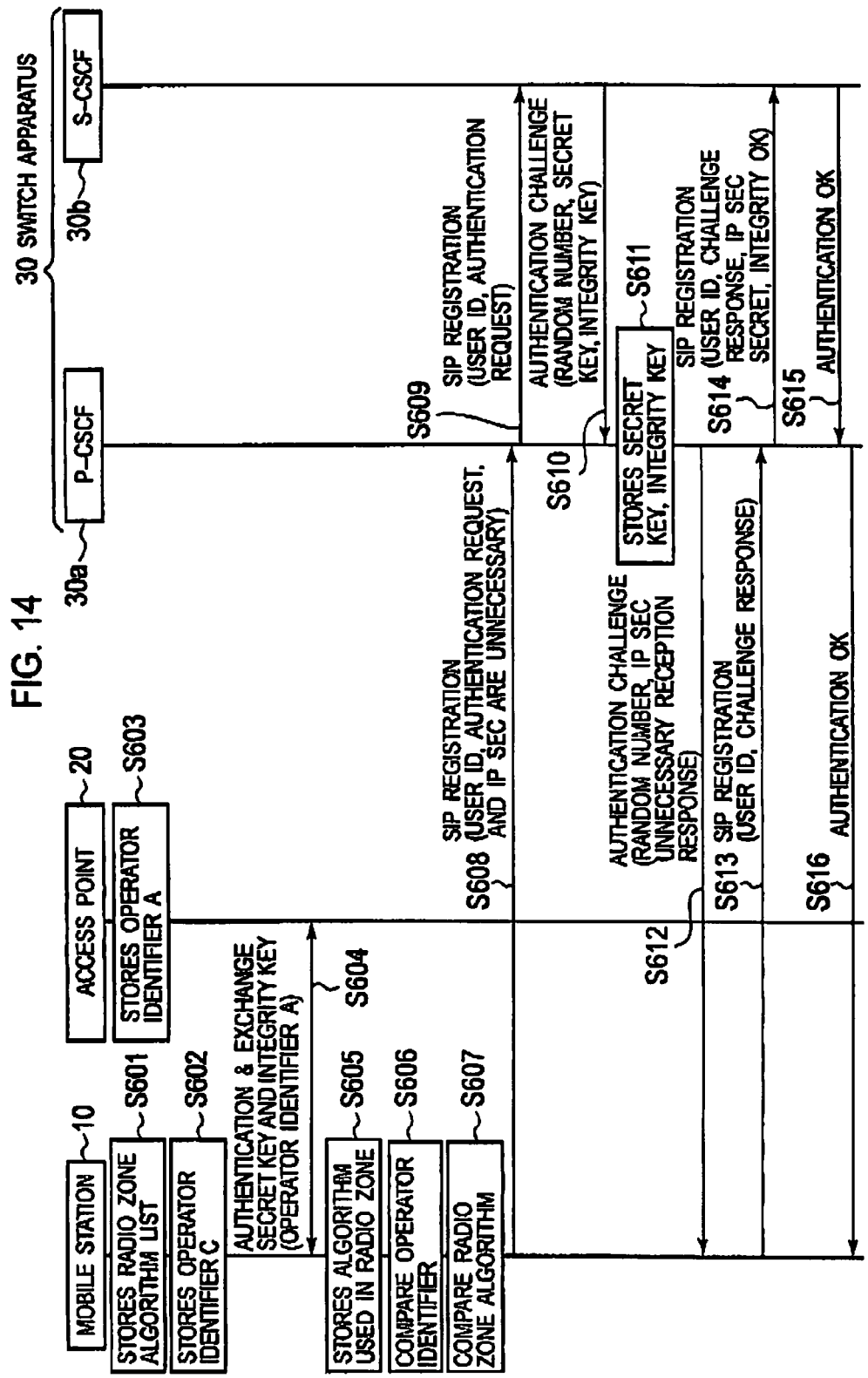
FIG. 14 is a sequence diagram showing a communication method according to the sixth embodiment of the present invention.

Next, a communication method in accordance with the sixth embodiment is described with reference to FIG. 14.

First, the mobile station 10 stores a radio zone algorithm list (S601), and the identifier (e.g., an operator identifier C) which uniquely identifies the apparatus controlling the switch apparatus 30 (S602). Further, the access point 20 stores the identifier (e.g., an operator identifier A) which uniquely identifies the apparatus controlling the radio access system (S603).

Next, the mobile station 10 performs an authentication with the access point 20 located on the radio access system, so as to exchange a secret key and an integrity key (S604). At this time, the access point 20 transmits the operator identifier A to the mobile station 10, and the mobile station 10 stores the operator identifier A.

Next, the mobile station 10 stores an algorithm for the secret and the integrity to be used in a radio zone (S605). Here, the secured connection is established between the mobile station 10 and the access point 20 located on the radio access system.

Next, the mobile station 10 compares the operator identifier C and the operator identifier A (S8606). Subsequently, the mobile station 10 compares the algorithm used in the radio access system and the algorithm list (S607). Here, when the operator identifier C and the operator identifier A are the same, and also when the algorithm used in the radio access system is set so as unnecessary an IPsec in the algorithm list, the mobile station 10 judges that establishing the secured connection is unnecessary. Incidentally, the processes described herein below are performed when it is judged that the connection is unnecessary, when the connection is necessary, the connection is established by performing the same procedure as a conventional procedure.

Meanwhile, processes of steps S608 to S616 are the same as those of steps S108 to S116 shown in FIG. 2, so that further description thereof is omitted.

(Operation and Effects)

In accordance with the communication system, the mobile station 10, and the communication method according to the sixth embodiment, the mobile station 10 judges whether or not to establish the secured connection between the mobile station 10 and the switch apparatus 30 by comparing the identifier (e.g., the operator identifier C) which uniquely identifies the apparatus controlling the switch apparatus and the identifier (e.g., the operator identifier A) which uniquely identifies the apparatus controlling the radio access system, and by comparing the algorithm used in the radio access system and the algorithm list.

Therefore, in accordance with the communication system, the mobile station 10, and the communication method according to the sixth embodiment, it is possible to skip an encryption process of the IMS and to eliminate an unnecessary encryption process. Therefore, it is possible to shorten the time of a connection delay and to reduce a process load on the mobile station and the network.

Further, in the sixth embodiment, it is unnecessary to receive an operator identifier from the switch apparatus 30, so it is possible to shorten the time of a connection delay and reduce the process load on a mobile station and a switch apparatus, even more. In addition, in the sixth embodiment, algorithms in the radio zone are compared, so that when a strong security connection is established, a finer control becomes possible in such a way that a now connection is not established between the mobile station 10 and the switch apparatus 30.

Seventh Embodiment

In a seventh embodiment, a description is given for an example in which a switch apparatus stores a range of IP addresses that its own radio access system assigns, and compares it with the IP address of a mobile station, and thereby judges whether or not to establish a connection.

(Communication System)

Figures 15, 16:
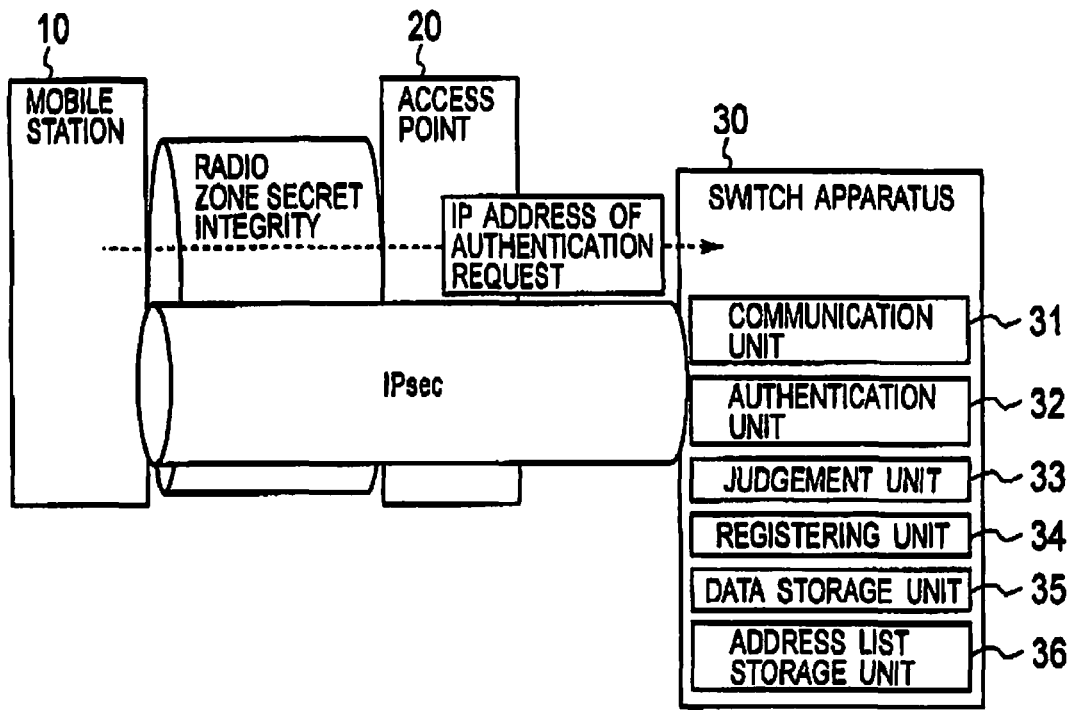
FIG. 15 is a diagram showing a configuration of a communication system according to a seventh embodiment of the present invention.
FIG. 16 is an example of IP address list according to the seven embodiment of the present invention.

As shown in FIG. 15, a communication system according to the seventh embodiment includes a mobile station 10, an access point 20 (e.g., a base station) located on a radio access system, and a switch apparatus 30 (e.g., an IMS apparatus) connected to the radio access system. In this communication system, it is assumed that a secured (a secret/an integrity) connection is established between the mobile station 10 and the access point 20.

As shown in FIG. 15, the switch apparatus 30 includes a communication unit 31, an authentication unit 32, a judgment unit 33, a registering unit 34, a data storage unit 35, and an address list storage unit 36.

The communication unit 31 performs communication with the mobile station 10 so as to perform transmission/reception of an IP address, a user ID, an authentication request, and signals of various kinds.

The authentication unit 32 performs an authentication between the mobile station 10 and the switch apparatus 30.

The judgment unit 33 judges whether or not to establish the secured connection between the mobile station 10 and the switch apparatus 30. To be more precise, the judgment unit 33 judges whether or not to establish the connection by comparing the address of the mobile station 10 transmitted from the mobile station 10 and an address list stored by the address list storage unit 36.

The registering unit 34 performs an SIP registration on the mobile station 10.

The data storage unit 35 stores IP addresses, data in the middle of a transmission, and the like, which have been received.

As shown in FIG. 16, the address list storage unit 36 stores the address list indicating the range of IP addresses that the radio access system on which the switch apparatus 30 is located to assigns.

(Communication Method)

Next, a communication method in accordance with the seventh embodiment 18 described with reference to FIG. 17. It is assumed that the switch apparatus 30 stores an IP address list.

First, the mobile station 10 performs the authentication with the access point 20 located on the radio access system, so as to exchange a secret key and an integrity key (S701).

Next, the mobile station 10 stores an algorithm for the secret and the integrity to be used in a radio zone (S702). Here, the secured connection is established between the mobile station 10, and the access point 20 located on the radio access system.

Thereafter, the mobile station 10 transmits the user ID, the authentication request, the IPsec security association, and the like to the P-CSCF 30a so as to perform the SIP registration (S703). Next, the P-CSCF 30a transmits an IPsec necessary/unnecessary acknowledgement request, including the IP address, to the mobile station 10 (S704).

Next, the judgment unit 33 judges whether or not to establish the secured connection between the mobile station 10 and the switch apparatus 30 (S705). To be more precise, the judgment unit 33 judges whether or not to establish the connection by comparing the address of the mobile station 10 transmitted from the mobile station 10 and the IP address list stored by the address list storage unit 36. For example, the judgment unit 33 judges that the IP address of the mobile station transmitted from the mobile station 10 is an IP address that its own radio access system has assigned, when the IP address is in an IP address range shown in FIG. 16, and judges that establishing the secured connection is unnecessary.

Thereafter, the judgment unit 33 transmits a response, notifying that IPsec is unnecessary, to the P-CSCF 30a (S706). Incidentally, the processes described herein below are performed when it is judged that the connection is unnecessary, when the connection is necessary, the connection is established by performing the same procedure as a conventional procedure.

Meanwhile, processes of steps S707 to S714 are the same as those of steps S109 to S116 shown in FIG. 2, so that further description thereof is omitted.

(Operation and Effects)

In accordance with the communication system, the switch apparatus 30, and the communication method according to the seventh embodiment, the switch apparatus 30 compares the address of the mobile station 10 and the IP address list stored by the address list storage unit 36, and thereby judges whether or not to establish the secured connection between the mobile station 10 and the switch apparatus 30. When the address of the mobile station 10 is included in the address list, the secured connection is already established between the mobile station 10 and the switch apparatus 30, so that it is judged that establishing a new connection is unnecessary.

Therefore, in accordance with the communication system, the switch apparatus 30, and the communication method according to the seventh embodiment, it is possible to skip an encryption process of the IMS and to eliminate an unnecessary encryption process. Therefore, it is possible to shorten the time of a connection delay and to reduce a process load on the mobile station and the network.

Eighth Embodiment

In the seventh embodiment, the switch apparatus 30 compares the address of the mobile station 10 and the address list; however, in an eighth embodiment, a description is given for an example in which, in addition to the above comparison, algorithm lists are compared to judge whether or not to establish a connection.

(Communication System)

Figure 18:
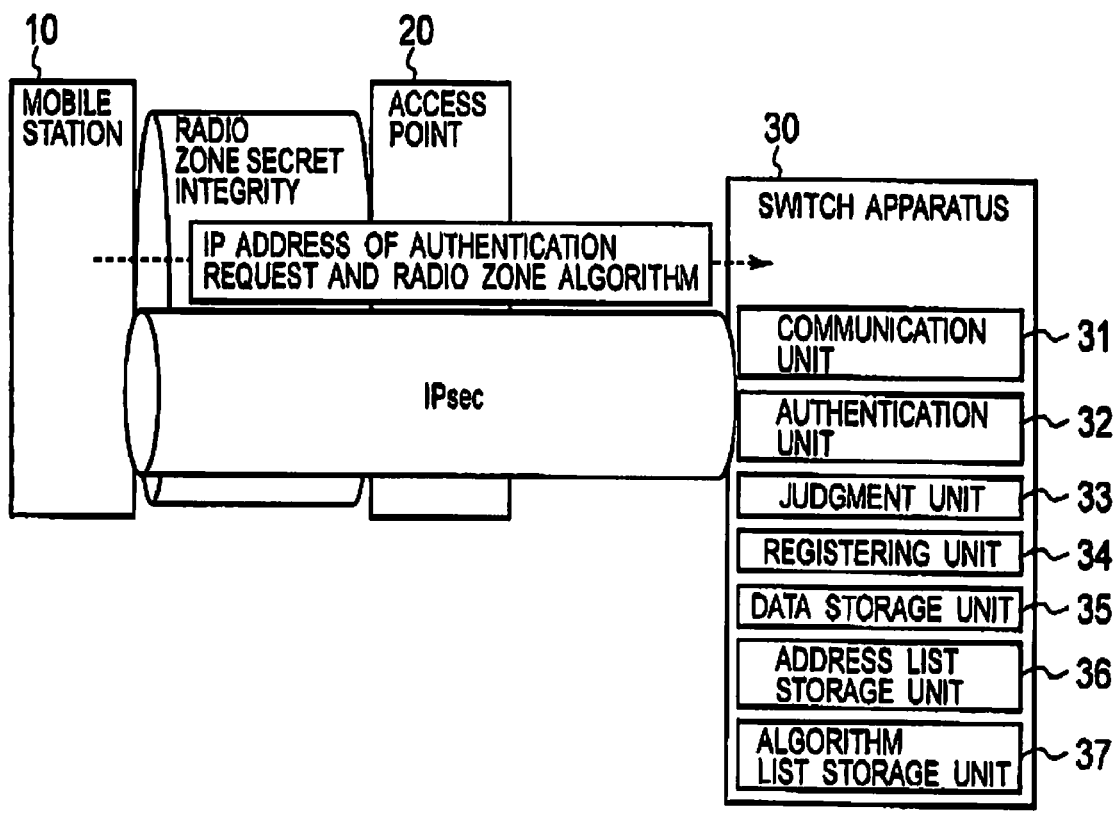
FIG. 18 is a diagram showing a configuration of a communication system according to an eighth embodiment of the present invention.

As shown in FIG. 18, a communication system according to the eighth embodiment includes a mobile station 10, an access point 20 (e.g., a base station) located on a radio access system, and a switch apparatus 30 (e.g., an IMS apparatus) connected to the radio access system. In this communication system, it is assumed that a secured (a secret/an integrity) connection is established between the mobile station 10 and the access point 20.

As shown in FIG. 18, the switch apparatus 30 includes a communication unit 31, an authentication unit 32, a judgment unit 33, a registering unit 34, a data storage unit 35, an address list storage unit 36, and an algorithm list storage unit 37.

The judgment unit 33 judges whether or not to establish the secured connection between the mobile station 10 and the switch apparatus 30. To be more precise, the judgment unit 33 judges whether or not to establish the connection by comparing the address of the mobile station 10 transmitted from the mobile station 10, and an address list, and by comparing the algorithm used in the radio access system and the algorithm list.

The communication unit 31, the authentication unit 32, the registering unit 34, the date storage unit 36, and the address list storage unit 36 are the same as those of the seventh embodiment, so that description thereof is herein omitted. In addition, the algorithm storage unit 37 is the same as that of the fourth embodiment so that further description thereof is herein omitted.

(Communication Method)

Figure 19:
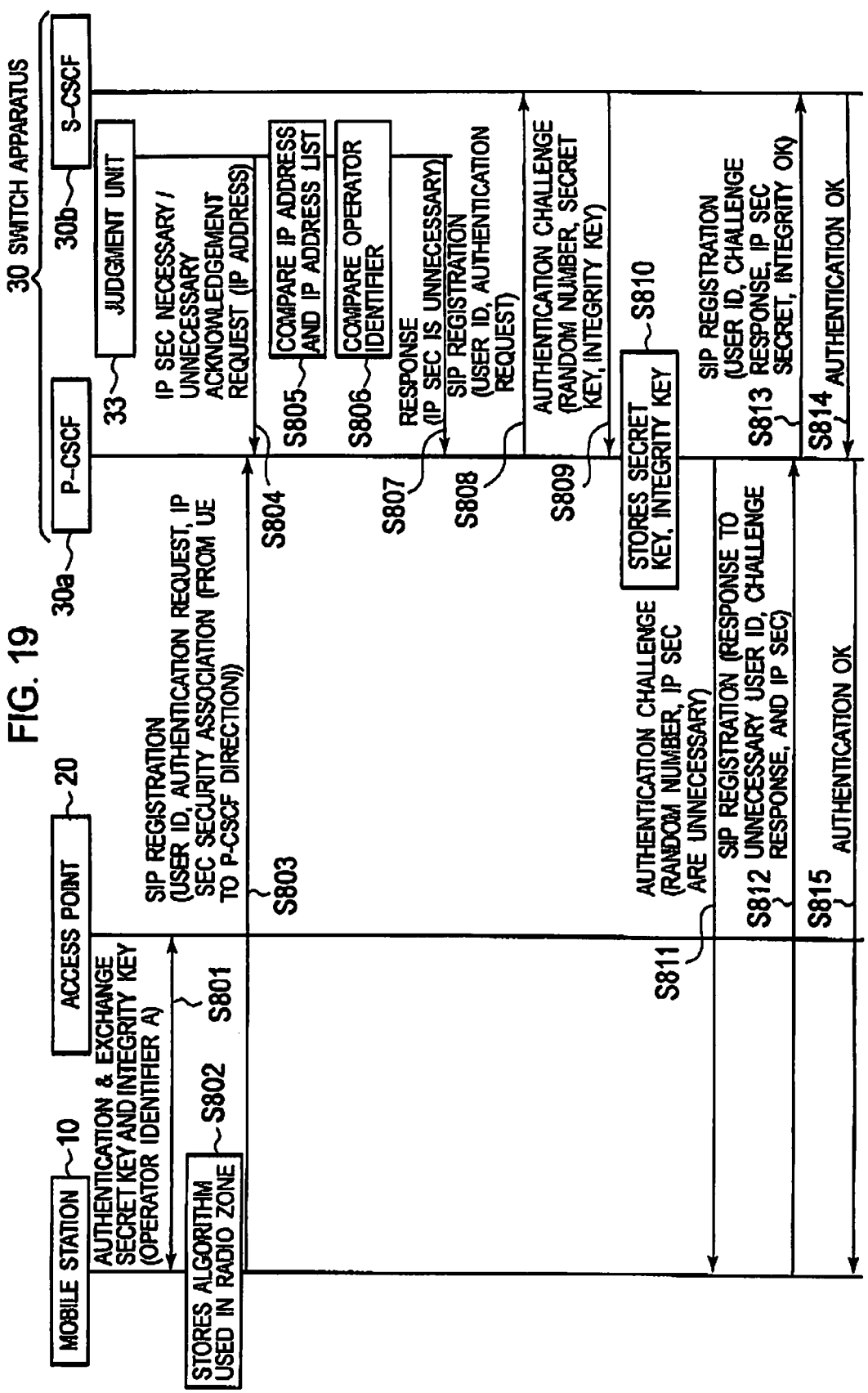
FIG. 19 is a sequence diagram showing a communication method according to the eighth embodiment of the present invention.
Figure 20:
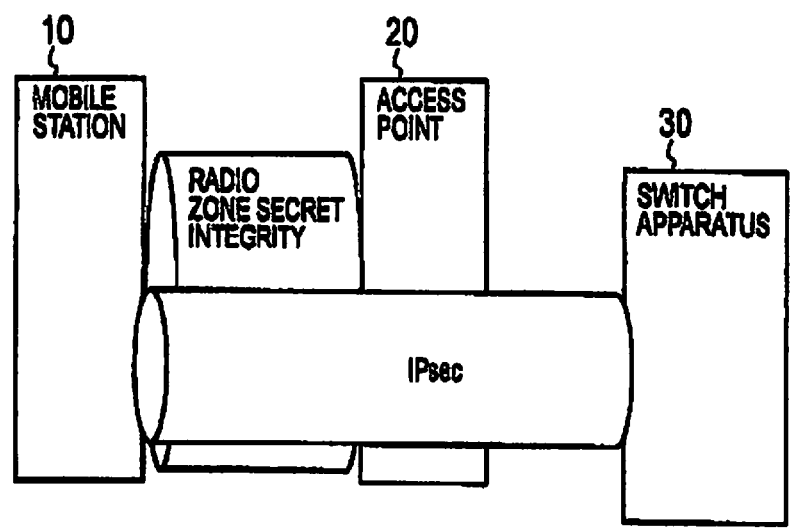
FIG. 20 is a diagram showing a configuration of a conventional communication system.
Figure 21:
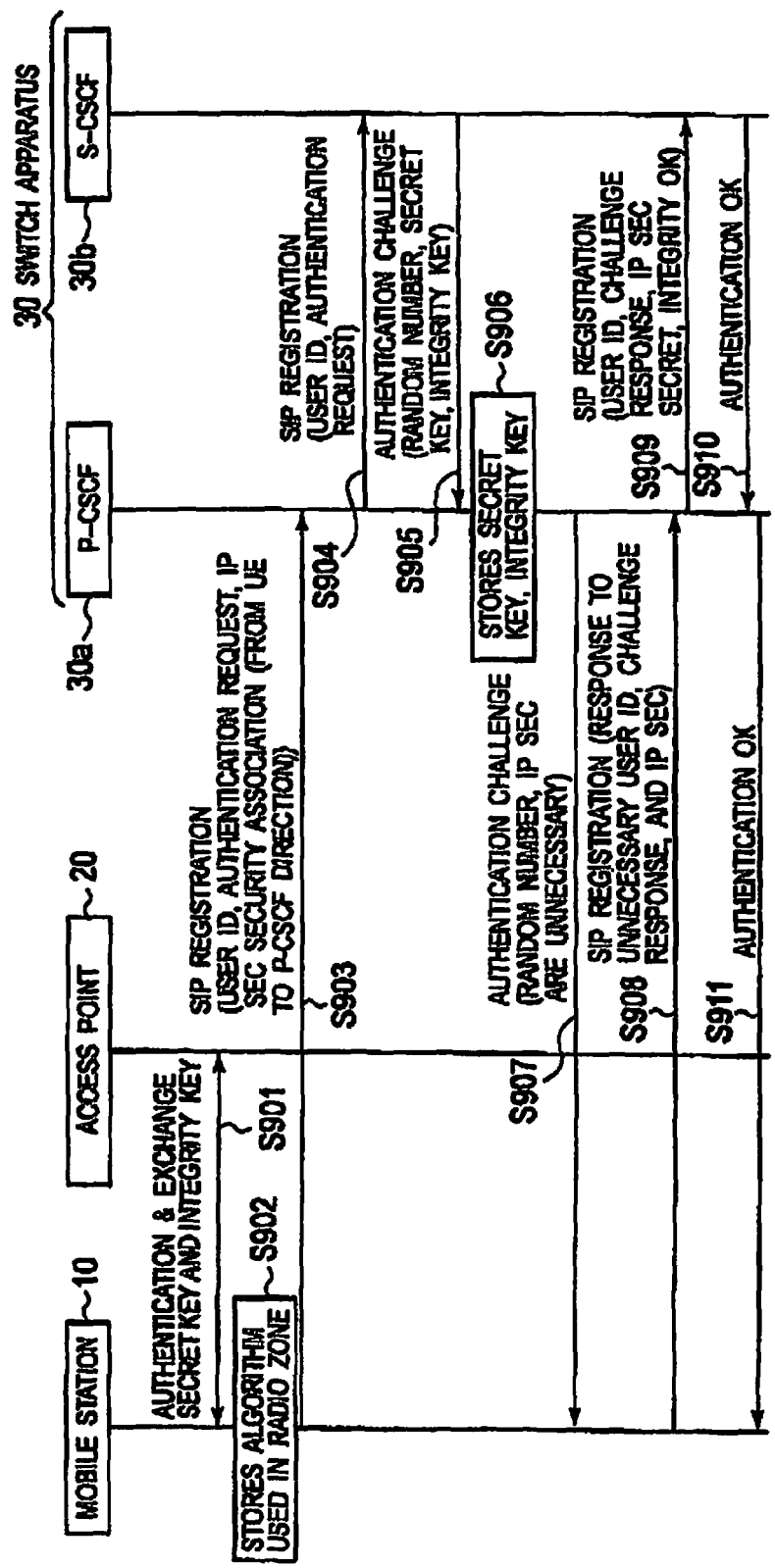
FIG. 21 is a sequence diagram showing a communication method of a conventional communication system.

Next, a communication method in accordance with the eighth embodiment is described with reference to FIG. 19. It is assumed that the switch apparatus 30 stores an IP address list and a radio zone algorithm list.

Figure 17:
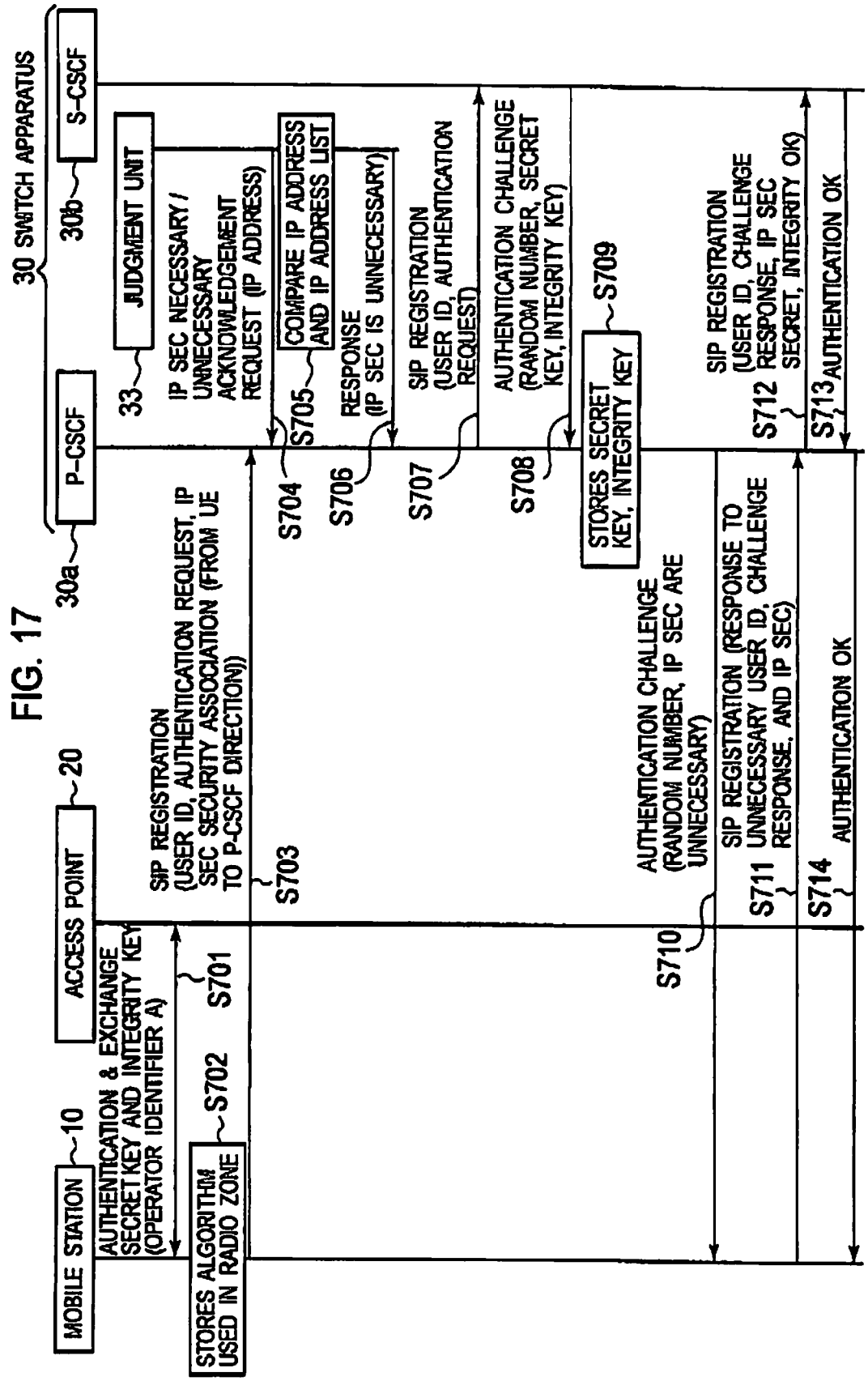
FIG. 17 is a sequence diagram showing a communication method according to the seventh embodiment of the present invention.

Meanwhile, processes of steps S801 to S804 are the same as those of steps S701 to S704 shown in FIG. 17, so that further description thereof is omitted.

The judgment unit 33 judges whether or not to establish a secured connection between the mobile station 10 and the switch apparatus 30 (S805 and S806). To be more precise, the judgment unit 33 compares the address of the mobile station 10 transmitted from the mobile station 10 and the IP address list stored by the address list storage unit 36 (S805). Next, the judgment unit 33 compares the algorithm used in the radio access system, and the radio zone algorithm list (S806). Here, when the IP address of the mobile station 10 corresponds to the IP address list and also when an algorithm used in the radio access system is set so as not to need an IPsec in the radio zone algorithm list, the switch apparatus 30 judges that it is unnecessary to establish a secured connection. Incidentally, the following processes are those in the case where it is judged that establishing the connection is unnecessary, but when a connection is necessary, it is established in the same procedure as a conventional procedure.

Meanwhile, processes of steps S807 to S815 are the same as those of steps S706 to S714 shown in FIG. 17, so that further description thereof is omitted.

In accordance with the communication system, the switch apparatus 30, and the communication method according to the eighth embodiment, the switch apparatus 30 judges whether or not to establish a secured connection between the mobile station 10 and the switch apparatus 30 by comparing the address of the mobile station 10 and the IP address list, and by comparing the algorithm used in the radio access system, and the radio zone algorithm list.

Therefore, in accordance with the communication system, the switch apparatus 30, and the communication method according to the eighth embodiment, it is possible to skip an encryption process of the IMS and to eliminate an unnecessary encryption process. Therefore, it is possible to shorten the time of a connection delay and to reduce a process load on the mobile station and the network.

In addition, in the eighth embodiment, algorithms in the radio zone are compared, so that when a strong security connection is established, a finer control becomes possible in such a way that a new connection is not established between the mobile station 10 and the switch apparatus 30.

Other Embodiments

The present invention has been set forth in the above described embodiments. But it should not be understood that the discussion and the drawings constituting a part of this disclosure are interpreted to limit the present invention. It is apparent to those skilled in the art that various alternatives, modifications, and the practices can be achieved based on this disclosure.

For example, in the description of the first to sixth embodiments, the identifier which uniquely identifies the apparatus controlling the radio access system, and the identifier which uniquely identifies the apparatus controlling the switch apparatus have been compared, but the identifier which uniquely identifies the radio access system, and the identifier which uniquely identifies the switch apparatus may be compared.

Further, in the description of the seventh and eight embodiments, the judgment unit 33, the address list storage unit 36, the algorithm list storage unit 37, and the like are located on one switch apparatus 30, but each of these units may be located on an apparatus other than the switch apparatus.

As described above, the present invention naturally includes various embodiments and the like which are not herein described. Accordingly, the scope of the present invention is indicated only by the appended claims being relevant to the foregoing description.

INDUSTRIAL APPLICABILITY

In accordance with the present invention, it is possible to provide a communication system, a mobile station, a switch apparatus, and a communication method, which can shorten a time of delay in connecting the mobile station and a network, and can reduce a process load on the mobile station and the network.

The invention claimed is:

1. A communication system for establishing a secured first connection between a mobile station and an access point located on a radio access system, comprising:
    a judgment unit configured to judge,
        in case of an identification of an identical first identifier that uniquely identifies a radio-access-system-controlling apparatus and a second identifier that uniquely identifies a switch-controlling apparatus, not to establish a secured second connection between the mobile station and a switch apparatus connected to the radio access system and to keep the secured first connection, and
        in case of an identification of a non-identical first identifier and second identifier, to establish the secured second connection between the mobile station and the switch apparatus;
    an address list storage unit configured to store an address list that indicates a range of an address assigned by the radio access system on which the switch apparatus is located; and
    an algorithm list storage unit configured to store, as an algorithm list, a secured algorithm used in the radio access system or a non-secured algorithm used in the radio access system on which the access point is located;
    wherein
    the judgment unit is configured to judge whether or not to establish the secured second connection by comparing the address list and an address of the mobile station transmitted from the mobile station, and by comparing the algorithm list and the algorithm used in the radio access system on which the access point is located.

2. The communication system according to claim 1, wherein
    the judgment unit is configured to further judge whether or not to establish the secured second connection by comparing the first identifier with the second identifier.

3. The communication system according to claim 1, further comprising:
    an identifier list storage unit configured to store an identifier list which is a combination of the first identifier and the second identifier; wherein
    the judgment unit is configured to further judge whether or not to establish the secured second connection by comparing the identifier list with the first identifier and the second identifier.

4. The communication system according to claim 1, wherein the mobile station further comprises an identifier storage unit configured to store the second identifier, and
    the judgment unit is configured to further judge whether or not to establish the secured second connection by comparing a stored identifier stored in the identifier storage unit and the first identifier.

5. The communication system according to claim 1, wherein
    the judgment unit is configured to further judge whether or not to establish the secured second connection by comparing the first identifier and the second identifier.

6. The communication system according to claim 1, further comprising:
    an identifier list storage unit configured to store an identifier list, which is a combination of the first identifier and the second identifier;
    wherein
    the judgment unit is configured to further judge whether or not to establish the secured second connection, by comparing the first identifier, the second identifier, and the identifier list.

7. The communication system according to claim 1, wherein the mobile station further comprises:
    an identifier storage unit configured to store the second identifier;
    wherein
    the judgment unit is configured to further judge whether or not to establish the secured second connection, by comparing a stored identifier stored in the identifier storage unit and the first identifier.

8. A communication system for establishing a secured first connection between a mobile station and an access point located on a radio access system, comprising:
    a judgment unit configured to judge,
        In case of an identification of an identical first identifier that uniquely identifies a radio-access-system-controlling apparatus and a second identifier that uniquely identifies a switch-controlling apparatus, not to establish a secured second connection between the mobile station and a switch apparatus connected to the radio access system and to keep the secured first connection, and
        in case of an identification of a non-identical first identifier and second identifier, to establish the secured second connection between the mobile station and the switch apparatus; and
    an address list storage unit configured to store an address list that indicates a range of an address assigned by the radio access system on which the switch apparatus is located; and
    an algorithm list storage unit configured to store, as an algorithm list, a secured algorithm used in the radio access system or a non-secured algorithm used in the radio access system on which the access point is located;
    wherein
    the judgment unit is configured to judge whether or not to establish the secured second connection by comparing the address list and an address of the mobile station transmitted from the mobile station, and by comparing the algorithm list and the algorithm used in the radio access system on which the access point is located.

9. A mobile station for establishing a secured first connection with an access point located on a radio access system, comprising:
    a judgment unit configured to judge, In case of an identification of an identical first identifier that uniquely identifies a radio-access-system-controlling apparatus and a second identifier that uniquely identifies a switch-controlling apparatus, not to establish a secured second connection between the mobile station and a switch apparatus connected to the radio access system and to keep the secured first connection, and in case of an identification of a non-identical first identifier and second identifier, to establish the secured second connection between the mobile station and the switch apparatus;

an address list storage unit configured to store an address list that indicates a range of an address assigned by the radio access system on which the switch apparatus is located; and an algorithm list storage unit configured to store, as an algorithm list, a secured algorithm used in the radio access system or a non-secured algorithm used in the radio access system on which the access point is located; wherein the judgment unit is configured to judge whether or not to establish the secured second connection by comparing the address list and an address of the mobile station transmitted from the mobile station, and by comparing the algorithm list and the algorithm used in the radio access system on which the access point is located.

10. A switch apparatus connected to a radio access system in a communication system for establishing a secured first connection between a mobile station and an access point located on the radio access system, comprising:

a judgment unit configured to judge,

In case of an identification of an identical first identifier that uniquely identifies a radio-access-system-controlling apparatus and a second identifier that uniquely identifies a switch-controlling apparatus, not to establish a secured second connection between the mobile station and a switch apparatus connected to the radio access system and to keep the secured first connection, and in case of an identification of a non-identical first identifier and second identifier, to establish the secured second connection between the mobile station and the switch apparatus;

an address list storage unit configured to store an address list that indicates a range of an address assigned by the radio access system on which the switch apparatus is located; and an algorithm list storage unit configured to store, as an algorithm list, a secured algorithm used in the radio access system or a non-secured algorithm used in the radio access system on which the access point is located; wherein the judgment unit is configured to judge whether or not to establish the secured second connection by comparing the address list and an address of the mobile station transmitted from the mobile station, and by comparing the algorithm list and the algorithm used in the radio access system on which the access point is located.

11. A communication method in a communication system provided with a mobile station, an access point located on a radio access system, and a switch apparatus connected to the radio access system, comprising:

establishing a first secured connection between the mobile station and the access point; and not establishing a secured second connection between the mobile station and a switch apparatus connected to the radio access system and to keep the secured first connection in case of an identification of a first identifier that uniquely identifies a first apparatus controlling the radio access system and a second identifier that uniquely identifies a second apparatus controlling the switch apparatus, and establishing the secured second connection between the mobile station and a switch apparatus connected to the radio access system in case of a non-identical first identifier that uniquely identifies the first apparatus controlling the radio access system and a second identifier that uniquely identifies the second apparatus controlling the switch apparatus;

storing an address list that indicates a range of an address assigned by the radio access system on which the switch apparatus is located; and storing as an algorithm list a secured algorithm used in the radio access system or a non-secured algorithm used in the radio access system on which the access point is located; wherein determining whether or not to establish the secured second connection includes comparing the address list and an address of the mobile station transmitted from the mobile station, and comparing the algorithm list and the algorithm used in the radio access system on which the access point is located.

12. A communication method in a communication system provided with a mobile station, an access point located on a radio access system, and a switch apparatus connected to the radio access system, comprising;

establishing a first secured connection between the mobile station and the access point; and determining whether or not to establish a secured second connection between the mobile station and the switch apparatus, wherein In case of an identification of an identical first identifier that uniquely identifies a radio-access-system-controlling apparatus and a second identifier that uniquely identifies a switch-controlling apparatus, not to establish a secured second connection between the mobile station and a switch apparatus connected to the radio access system and to keep the secured first connection, and in case of an identification of a non-identical first identifier and second identifier, to establish the secured second connection between the mobile station and the switch apparatus;

storing an address list that indicates a range of an address assigned by the radio access system on which the switch apparatus is located; and storing as an algorithm list a secured algorithm used in the radio access system or a non-secured algorithm used in the radio access system on which the access point is located; wherein determining whether or not to establish the secured second connection includes comparing the address list and an address of the mobile station transmitted from the mobile station, and comparing the algorithm list and the algorithm used in the radio access system on which the access point is located.

* * * * *